United States Patent
Wang et al.

(10) Patent No.: US 10,231,244 B2
(45) Date of Patent: Mar. 12, 2019

(54) METHOD AND DEVICE FOR PROCESSING D2D COMMUNICATION, D2D COMMUNICATION DEVICE AND ENODEB

(71) Applicant: ZTE CORPORATION, Shenzhen, Guangdong Province (CN)

(72) Inventors: Wenhuan Wang, Shenzhen (CN); Jin Yang, Shenzhen (CN); Shuanshuan Wu, Shenzhen (CN); Shuanghong Huang, Shenzhen (CN); Ming Yuan, Shenzhen (CN)

(73) Assignee: ZTE CORPORATION, Shenzhen, Guangdong Province (CN)

( * ) Notice: Subject to any disclaimer, the term of this patent is extended or adjusted under 35 U.S.C. 154(b) by 39 days.

(21) Appl. No.: 15/501,299

(22) PCT Filed: Dec. 22, 2014

(86) PCT No.: PCT/CN2014/094560
§ 371 (c)(1),
(2) Date: Feb. 2, 2017

(87) PCT Pub. No.: WO2015/154524
PCT Pub. Date: Oct. 15, 2015

(65) Prior Publication Data
US 2017/0223711 A1    Aug. 3, 2017

(30) Foreign Application Priority Data

Aug. 7, 2014 (CN) .......................... 2014 1 0387015

(51) Int. Cl.
*H04W 72/04* (2009.01)
*H04W 76/14* (2018.01)
(Continued)

(52) U.S. Cl.
CPC ....... *H04W 72/0493* (2013.01); *H04L 5/0012* (2013.01); *H04L 5/0032* (2013.01);
(Continued)

(58) Field of Classification Search
CPC ............ H04W 72/0493; H04W 76/14; H04W 76/023
See application file for complete search history.

(56) References Cited

U.S. PATENT DOCUMENTS

| | | | |
|---|---|---|---|
| 2013/0322413 A1* | 12/2013 | Pelletier | H04W 72/1289 370/336 |
| 2015/0245192 A1* | 8/2015 | Wu | H04W 8/005 370/329 |

FOREIGN PATENT DOCUMENTS

| | | |
|---|---|---|
| CN | 102395160 | 3/2012 |
| CN | 103068049 | 4/2013 |

(Continued)

OTHER PUBLICATIONS

International Search Report, International application No. PCT/CN2014/094560, dated Apr. 29, 2015.

*Primary Examiner* — Lakeram Jangbahadur
(74) *Attorney, Agent, or Firm* — Ferguson Case Orr Paterson LLP

(57) ABSTRACT

The present disclosure provides a method and device for processing Device-to-Device (D2D) communication, a D2D communication device and an Evolved Node B (eNodeB). Wherein, the method includes that: resources configured for Scheduling Assignment (SA) and/or data of D2D communication are divided into M resource groups, each resource group including X ResourceUnits (RUs) formed by N time-domain RUs*K frequency-domain RUs, each RU including O symbols on a time domain and including P subcarriers on a frequency domain, the X RUs in each resource group being configured to configure T logical channels, each logical channel including Num RUs according to a number Num of (Continued)

sending times and locations of each logical channel in the resource groups being determined according to a preset rule; and D2D communication processing is performed according to a determined resource configuration.

25 Claims, 13 Drawing Sheets

(51) Int. Cl.
*H04L 5/00* (2006.01)
*H04L 5/16* (2006.01)

(52) U.S. Cl.
CPC .......... *H04L 5/0039* (2013.01); *H04L 5/0094* (2013.01); *H04L 5/16* (2013.01); *H04W 76/14* (2018.02); *Y02D 70/00* (2018.01); *Y02D 70/1262* (2018.01); *Y02D 70/1264* (2018.01); *Y02D 70/21* (2018.01)

(56) References Cited

FOREIGN PATENT DOCUMENTS

| CN | 103442442 | 12/2013 |
| CN | 103686676 | 3/2014 |

\* cited by examiner

|   | Time-domain resource (sub-frame) | | | | |
|---|---|---|---|---|---|
| 1~2PRB | 1 | 5 | 8 | 3 | 7 |
| Frequency-domain resource | 2 | 6 | 9 | 10 | 4 |
|  | 3 | 1 | 5 | 8 | 10 |
|  | 4 | 7 | 2 | 6 | 9 |

Fig. 15

|   | Time-domain resource (sub-frame) | | | | |
|---|---|---|---|---|---|
| 1~2PRB | 1 | 1 | 2 | 3 | 4 |
| Frequency-domain resource | 2 | 5 | 5 | 6 | 7 |
|  | 3 | 6 | 8 | 8 | 9 |
|  | 4 | 7 | 9 | 10 | 10 |

Fig. 16

|   | Time-domain resource (sub-frame) | | | | |
|---|---|---|---|---|---|
| 1~2PRB | 1 | 7 | 8 | 6 | 4 |
| Frequency-domain resource | 2 | 1 | 9 | 10 | 7 |
|  | 3 | 5 | 2 | 8 | 9 |
|  | 4 | 6 | 5 | 3 | 10 |

Fig. 17

|                          | Time-domain resource (sub-frame) |   |   |    |    |
|--------------------------|----|---|---|----|----|
| 1~2PRB                   | 1  | 5 | 8 | 10 | 4  |
| Frequency-domain resource | 2  | 6 | 9 | 3  | 7  |
|                          | 3  | 7 | 2 | 6  | 9  |
|                          | 4  | 1 | 5 | 8  | 10 |

Fig. 18

|                          | Time-domain resource (sub-frame) |   |   |    |    |
|--------------------------|----|---|---|----|----|
| 1~2PRB                   | 1  | 4 | 8 | 6  | 3  |
| Frequency-domain resource | 2  | 5 | 9 | 8  | 7  |
|                          | 3  | 6 | 1 | 10 | 9  |
|                          | 4  | 7 | 5 | 2  | 10 |

Fig. 19

|                     | ←——Time-domain resource (sub-frame)——→ |   |   |    |    |
|---------------------|:--:|:--:|:--:|:--:|:--:|
| 1~2PRB              | 1  | 1  | 7  | 10 | 9  |
| Frequency-domain resource | 2  | 5  | 2  | 5  | 10 |
|                     | 3  | 6  | 8  | 3  | 6  |
|                     | 4  | 7  | 9  | 8  | 4  |

| Frequency-domain resource | | Time-domain resource (sub-frame) | | | | | |
|---|---|---|---|---|---|---|---|
| 1~2PRB | | 1 | 5 | 8 | 10 | 12 | 4 |
| | | 2 | 6 | 9 | 11 | 3 | 7 |
| | | 3 | 7 | 12 | 2 | 6 | 9 |
| | | 4 | 11 | 1 | 5 | 8 | 10 |

Fig. 22

| Frequency-domain resource | | Time-domain resource (sub-frame) | | | | | | | |
|---|---|---|---|---|---|---|---|---|---|
| 1~2PRB | | 1 | 5 | 9 | 13 | 1 | 2 | 3 | 4 |
| | | 2 | 6 | 10 | 14 | 5 | 6 | 7 | 8 |
| | | 3 | 7 | 11 | 15 | 9 | 10 | 11 | 12 |
| | | 4 | 8 | 12 | 16 | 13 | 14 | 15 | 16 |

Fig. 23

METHOD AND DEVICE FOR PROCESSING D2D COMMUNICATION, D2D COMMUNICATION DEVICE AND ENODEB

TECHNICAL FIELD

The present disclosure relates to the field of communication, and particularly to a method and device for processing D2D communication, a Device-to-Device (D2D) communication device and an Evolved Node B (eNodeB).

BACKGROUND

Short-distance data sharing between users, small-scale social and commercial activities and a specific service oriented to a local specific user all gradually become non-negligible growth points in a next-stage wireless platform. For such a service type with an obvious local characteristic, under a normal condition, service data source of the type service is not required to pass through a core network, and a service is merely required to be implemented between users. Such a communication mode has a characteristic obviously different from a conventional cellular system communication mode, and for a short-distance communication user capable of using a D2D communication manner, D2D transmission not only saves radio spectrum resources, but also reduces data transmission pressure of a core network, and may reduce occupied system resources, improve spectral efficiency of a cellular communication system, reduce transmitted power consumption of User Equipment (UE) and reduce network operation cost to a great extent.

Resource allocation of D2D UE is divided into two working modes from a sending layer according to whether the D2D UE is covered by a related network or not: Mode 1: an eNodeB or a rel-10 relay node schedules a resource for sending of the D2D UE; and Mode 2: the D2D UE selects a resource in a resource pool for sending of the D2D UE by itself.

No matter which manner is adopted, since direct communication is adopted between UE during D2D communication, Transmitting (Tx) UE is required to send Scheduling Assignment (SA) information configured to indicate physical channel resource information and control information of sent D2D data. A difference between Mode 1 and Mode 2 is that an eNodeB configures SA and data resources for the Tx UE in Mode 1 while the Tx UE selects the SA and data resources from a resource pool in Mode 2. In each scenario, it is necessary to schedule the SA resource at first, SA indicates the data resource, and as a data indication carrier, the SA is equivalent to control information of data, and is required to be highly reliable. At present, SA pattern designing just emerges in a standard, and such a conflict problem in Mode 2 is that system duplexity restricts to mutual monitoring. Therefore, it is very important to improve SA designing reliability. At present, a retransmission support mechanism has been proposed in a conference to further improve SA reliability.

A D2D resource pool is a group of time-frequency resources configured for D2D. UE, and may be pre-configured or configured by a network. The D2D resource pool includes an SA resource pool and a data resource pool, and a Time Division Multiplex (TDM) configuration is adopted. FIG. 1 is a schematic diagram of resource indication and a relationship between an SA field and a data field according to a related technology. As shown in FIG. 1, SA includes indexes and frequency-domain offsets, resources for data are indicated by T-PRTs and frequency domain in the SA, and each SA index includes certain time-frequency resources in Resource Units (RUs), such as 1~2 Physical Resource Blocks (PRBs) on the frequency domain and a sub-frame on a time domain. In Mode 1, a scheduling eNodeB schedules a resource configuration of SA and data of Tx UE, the eNodeB notifies the UE, the Tx UE sends the SA and the data, and receiving UE reads the SA to obtain a resource indication and control information of the data, and then reads data information; and in Mode 2, the Tx UE selects an SA resource and a data resource randomly or in a certain manner, and indicates resource and control information of the data through the SA, and the receiving UE reads the SA to obtain the resource indication and control information of the data, and then reads the data information. But in the two modes, mutual monitoring of the UE may be restricted by duplexity.

Therefore, there exists the problem of incapability of UE in a D2D half-duplex system in monitoring each other in the related technology.

SUMMARY

The present disclosure provides a method and device for processing D2D communication, a D2D communication device and an eNodeB, so as to at least solve the problem of incapability of UE in a D2D half-duplex system in monitoring each other in the related technology.

According to an aspect of the present disclosure, a method for processing D2D communication is provided, including: determining a resource configuration configured for Scheduling Assignment (SA) and/or data of D2D communication, wherein resources configured for the SA and/or data of D2D communication are divided into M resource groups, each resource group includes X Resource Units (RUs) formed by N time-domain RUs*K frequency-domain RUs, each RU includes O symbols on a time domain, and includes P subcarriers on a frequency domain, the X RUs in each resource group are configured to configure T logical channels, each logical channel includes Num RUs according to the number Num of sending times, locations of each logical channel in the resource groups are determined according to a preset rule, and the preset rule is configured to limit that each logical channel in a resource group includes at least one RU which is located on different time domains at least once with the RUs of the other logical channels in the resource group, wherein M, N, K, X, O, P, T and Num are all integers; and performing D2D communication processing according to the determined resource configuration.

In an example embodiment, determining the resource configuration configured for the SA and/or data of D2D communication includes at least one of: receiving the resource configuration configured for the SA and/or data of D2D communication from an Evolved Node B (eNodeB); and monitoring resources configured for D2D communication, and determining the resource configuration configured for the SA and/or data of D2D communication according to a monitoring result.

In an example embodiment, determining the resource configuration configured for the SA and/or data of D2D communication includes: when the preset rule is that the number N of the time-domain RUs in each resource group is larger than the number K of the frequency-domain RUs or the number N of the time-domain RUs in each resource group is equal to the number K of the frequency-domain RUs, configuring that physical resources of the logical channels located in a same sub-frame during first transmission are located in different sub-frames at least once during retransmission.

In an example embodiment, configuring that the physical resources of the logical channels located in the same sub-frame during first transmission are located in different sub-frames at least once during retransmission when the number N of the time-domain RUs in each resource group is equal to the number K of the frequency-domain RUs includes: constructing a matrix and corresponding logical channel sequence numbers for the RUs in the resource groups according to the numbers of the time/frequency-domain RUs, and configuring that a sequence number is selected for sending according to a physical resource corresponding to the matrix sequence number during first transmission and for sending according to a physical resource corresponding to the sequence in a transposed matrix of the matrix during retransmission.

In an example embodiment, the frequency-domain RUs in the resource groups are continuously allocated, or are allocated at equal intervals; and the time-domain RUs in the resource groups are continuously allocated, or are allocated at equal intervals.

In an example embodiment, the preset rule limits in a following manner that each logical channel in a resource group includes at least one RU which is located on different time domains at least once with the RUs of the other logical channels in the resource group: Step 1: putting numbers 1, 2, 3, ... k*(m+1)/2 into cells numbered as (k, m) according to a following formula:

$$x(k, m) = m + \sum_{i=1}^{k} (\max(subn) - i + 1) \cdot \min(1, (i-1)),$$

where a row number is k, k>=1 and k<=max(subn)-1, a column number is m, m>=1 and m<=max(subn)-1, it is restricted that k+m<=max(subn), i is a natural number, max(subn) is a maximum time-domain SA physical unit number within an SA resource period, and min(1, (i-1)) adopts a relatively smaller value in 1, (i-1); Step 2: reading max(subn) numbers in the cells (k, m) in a following manner: for a first time, starting reading a first column from the cell of k=1 and m=1, then reading k=1 and a (max(subn)-1)th column, and sequentially filling the read numbers into a first row of [1, m+1], that is, k=1; for the second time, automatically increasing m by 1, starting reading a second column from the cell of k=1 and m=2, then reading k=1 and a (max(subn)-m)th column, and sequentially filling the read numbers into a second row of [2, m+1], that is, k=2, continuing reading k=1 and an (m=RoundU(max(subn)-1)/2)th column according to a same method, reading k=1 and numbers corresponding to an (m=RoundD(max(subn)-1)/2+1)th column, where RoundD is rounding down and RoundU is rounding up, and sequentially filling the read numbers into a (RoundU(max(subn)-1/2)th row of [RoundU(max(subn)-1/2, m+1]; then according to a reverse sequence, for the first time, starting reading the first column from a cell of k=1 and m=RoundD(max(subn)-1)/2+1, then reading k=1 and an (m=RoundU(max(subn)-1)/2)th column, and sequentially filling the read numbers into a row of [RoundU(max(subn)-1/2+1, m+1], ... ; then reading the second column according to a reading sequence of k=1 and m=max(subn)-2, then reading k=1 and the cell column of m=2, and sequentially filling the read numbers into the second last row of [k, m+1]; and sequentially reading k=1 and an (m=max(subn)-1)th column, then reading k=1 and the cell column of m=1, and sequentially filling the read numbers into the last row of [k, m+1].

In an example embodiment, that the preset rule limits in the abovementioned manner that each logical channel in a resource group includes at least one RU which is located on different time domains at least once with the RUs of the other logical channels in the resource group is repeated by adopting a following formula: x(k, m)=1+mod((4*(m-1)+k-1),5), where mod is a modulus operation.

In an example embodiment, performing D2D communication processing according to the determined resource configuration includes: performing resource selection according to a resource group indication about a resource group and a logical channel indication about a logical channel corresponding to the resource group in the determined resource configuration; and performing D2D communication processing according to a selected resource.

According to another aspect of the present disclosure, a method for processing Device-to-Device (D2D) communication is provided, including: determining a resource configuration configured for Scheduling Assignment (SA) and/or data of D2D communication, wherein resources configured for the SA and/or data of D2D communication are divided into M resource groups, each resource group includes X Resource Units (RUs) formed by N time-domain RUs*K frequency-domain RUs, each RU includes O symbols on a time domain, and includes P subcarriers on a frequency domain, the X RUs in each resource group are configured to configure T logical channels, each logical channel includes Num RUs according to the number Num of sending times, locations of each logical channel in the resource groups are determined according to a preset rule, and the preset rule is configured to limit that each logical channel in a resource group includes at least one RU which is located on different time domains at least once with the RUs of the other logical channels in the resource group, wherein M, N, K, X, O, P, T and Num are all integers; and sending the determined resource configuration to a D2D communication device.

In an example embodiment, determining the resource configuration configured for the SA and/or data of D2D communication includes at least one of: when the preset rule is that the number N of the time-domain RUs in each resource group is larger than the number K of the frequency-domain RUs or the number N of the time-domain RUs in each resource group is equal to the number K of the frequency-domain RUs, configuring that physical resources of the logical channels located in a same sub-frame during first transmission are located in different sub-frames at least once during retransmission.

In an example embodiment, configuring that the physical resources of the logical channels located in the same sub-frame during first transmission are located in different sub-frames at least once during retransmission when the number N of the time-domain RUs in each resource group is equal to the number K of the frequency-domain RUs includes: constructing a matrix and corresponding logical channel sequence numbers for the RUs in the resource groups according to the numbers of the time/frequency-domain RUs, and configuring that a sequence number is selected for sending according to a physical resource corresponding to the matrix sequence number during first transmission and for sending according to a physical resource corresponding to the sequence in a transposed matrix of the matrix during retransmission.

In an example embodiment, the preset rule limits in a following manner that each logical channel in a resource group includes at least one RU which is located on different time domains at least once with the RUs of the other logical channels in the resource group: Step 1: putting numbers 1, 2, 3, ... k*(m+1)/2 into cells numbered as (k, m) according to a following formula:

$$x(k, m) = m + \sum_{i=1}^{k} (\max(subn) - i + 1) \cdot \min(1, (i-1)),$$

where a row number is k, k>=1 and k<=max(subn)−1, a column number is m, m>=1 and m<=max(subn)−1, it is restricted that k+m<=max(subn), i is a natural number, max(subn) is a maximum time-domain SA physical unit number within an SA resource period, and min(1, (i−1)) adopts a relatively smaller value in 1, (i−1); Step 2: reading max(subn) numbers in the cells (k, m) in a following manner: for a first time, starting reading a first column from the cell of k=1 and m=1, then reading k=1 and a (max(subn)−1)th column, and sequentially filling the read numbers into a first row of [1, m+1], that is, k=1; for the second time, automatically increasing m by 1, starting reading a second column from the cell of k=1 and m=2, then reading k=1 and a (max(subn)−m)th column, and sequentially filling the read numbers into a second row of [2, m+1], that is, k=2, ... ; continuing reading k=1 and an (m=RoundU(max(subn)−1)/2)th column according to a same method, reading k=1 and numbers corresponding to an (m=RoundD(max(subn)−1)/2+1)th column, where RoundD is rounding down and RoundU is rounding up, and sequentially filling the read numbers into a (RoundU(max(subn)−1/2)th row of [RoundU(max(subn)−1/2, m+1]; then according to a reverse sequence, for the first time, starting reading the first column from a cell of k=1 and m=RoundD(max(subn)−1)/2+1, then reading k=1 and an (m=RoundU(max(subn)−1)/2)th column, and sequentially filling the read numbers into a row of [RoundU(max(subn)−1/2+1, m+1], ... ; then reading the second column according to a reading sequence of k=1 and m=max(subn)−2, then reading k=1 and the cell column of m=2, and sequentially filling the read numbers into the second last row of [k, m+1]; and sequentially reading k=1 and an (m=max(subn)−1)th column, then reading k=1 and the cell column of m=1, and sequentially filling the read numbers into the last row of [k, m+1].

In an example embodiment, that the preset rule limits in the abovementioned manner that each logical channel in a resource group includes at least one RU which is located on different time domains at least once with the RUs of the other logical channels in the resource group is repeated by adopting a following formula: x(k, m)=1+mod((4*(m−1)+k−1),5), where mod is a modulus operation.

In an example embodiment, sending the determined resource configuration to the D2D communication device includes: indicating a resource group and a logical channel corresponding to the resource group in the determined resource configuration; and sending to the D2D communication device the resource configuration including a resource group indication which indicates the resource group and a logical channel indication which indicates the logical channel corresponding to the resource group in the resource configuration.

According to another aspect of the present disclosure, a device for processing Device-to-Device (D2D) communication is provided, comprising a processor, configured to perform programming components stored in a memory, wherein the programming components comprise: a first determining component, configured to determine a resource configuration configured for Scheduling Assignment (SA) and/or data of D2D communication, wherein resources configured for the SA and/or data of D2D communication are divided into M resource groups, each resource group includes X Resource Units (RUs) formed by N time-domain RUs*K frequency-domain RUs, each RU includes O symbols on a time domain, and includes P subcarriers on a frequency domain, the X RUs in each resource group are configured to configure T logical channels, each logical channel includes Num RUs according to the number Num of sending times, locations of each logical channel in the resource groups are determined according to a preset rule, and the preset rule is configured to limit that each logical channel in a resource group includes at least one RU which is located on different time domains at least once with the RUs of the other logical channels in the resource group, wherein M, N, K, X, O, P, T and Num are all integers; and a processing component, configured to perform D2D communication processing according to the determined resource configuration.

In an example embodiment, the first determining component includes at least one of: a receiving element, configured to receive the resource configuration configured for the SA and/or data of D2D communication from an Evolved Node B (eNodeB); and a determining element, configured to monitor resources configured for D2D communication, and determine the resource configuration configured for the SA and/or data of D2D communication according to a monitoring result.

In an example embodiment, the first determining component includes: a first configurating element, configured to, when the preset rule is that the number N of the time-domain RUs in each resource group is larger than the number K of the frequency-domain RUs or the number N of the time-domain RUs in each resource group is equal to the number K of the frequency-domain RUs, configure that physical resources of the logical channels located in a same sub-frame during first transmission are located in different sub-frames at least once during retransmission.

In an example embodiment, the first configurating element includes: a first configurating sub-element, configured to construct a matrix and corresponding logical channel sequence numbers for the RUs in the resource groups according to the numbers of the time/frequency-domain RUs, and configure that a sequence number is selected for sending according to a physical resource corresponding to the matrix sequence number during first transmission and for sending according to a physical resource corresponding to the sequence in a transposed matrix of the matrix during retransmission.

In an example embodiment, the processing component includes: a selecting element, configured to perform resource selection according to a resource group indication about a resource group and a logical channel indication about a logical channel corresponding to the resource group in the determined resource configuration; and a processing element, configured to perform D2D communication processing according to a selected resource.

According to an aspect of the present disclosure, a Device-to-Device (D2D) communication device is provided, including any one of the abovementioned devices.

According to an aspect of the present disclosure, a device for processing Device-to-Device (D2D) communication is provided, comprising a processor, configured to perform programming components stored in a memory, wherein the programming components comprise: a second determining component, configured to determine a resource configuration configured for Scheduling Assignment (SA) and/or data of D2D communication, wherein resources configured for the SA and/or data of D2D communication are divided into M resource groups, each resource group includes X Resource Units (RUs) formed by N time-domain RUs*K frequency-domain RUs, each RU includes O symbols on a time domain, and includes P subcarriers on a frequency domain, the X RUs in each resource group are configured to configure T logical channels, each logical channel includes Num RUs according to the number Num of sending times, locations of each logical channel in the resource groups are determined according to a preset rule, and the preset rule is configured to limit that each logical channel in a resource group includes at least one RU which is located on different time domains at least once with the RUs of the other logical channels in the resource group, wherein M, N, K, X, O, P, T and Num are all integers; and a sending component, configured to send the determined resource configuration to a D2D communication device.

In an example embodiment, the second determining component includes: a second configurating element, configured to, when the preset rule is that the number N of the time-domain RUs in each resource group is larger than the number K of the frequency-domain RUs or the number N of the time-domain RUs in each resource group is equal to the number K of the frequency-domain RUs, configure that physical resources of the logical channels located in a same sub-frame during first transmission are located in different sub-frames at least once during retransmission.

In an example embodiment, the second configurating element includes: a second configurating sub-element, configured to construct a matrix and corresponding logical channel sequence numbers for the RUs in the resource groups according to the numbers of the time/frequency-domain RUs, and configure that a sequence number is selected for sending according to a physical resource corresponding to the matrix sequence number during first transmission and for sending according to a physical resource corresponding to the sequence in a transposed matrix of the matrix during retransmission.

In an example embodiment, the sending component includes: an indicating element, configured to indicate a resource group and a logical channel corresponding to the resource group in the determined resource configuration; and a sending element, configured to send to the D2D communication device the resource configuration including a resource group indication which indicates the resource group and a logical channel indication which indicates the logical channel corresponding to the resource group in the resource configuration.

According to an aspect of the present disclosure, an Evolved Node B (eNodeB) is provided, including any one of the abovementioned devices.

According to the present disclosure, the resource configuration configured for the SA and/or data of D2D communication is determined, wherein the resources configured for the SA and/or data of D2D communication are divided into the M resource groups, each resource group includes X RUs formed by N time-domain RUs*K frequency-domain RUs, each RU includes O symbols on the time domain, and includes P subcarriers on the frequency domain, the X RUs in each resource group are configured to configure T logical channels, each logical channel includes Num RUs according to the number Num of sending times, the locations of each logical channel in the resource groups are determined according to the preset rule, and the preset rule is configured to limit that each logical channel in a resource group includes at least one RU which is located on different time domains at least once with the RUs of the other logical channels in the resource group, wherein M, N, K, X, O, P, T and Num are all integers; and D2D communication processing is performed according to the determined resource configuration. Therefore, the problem of incapability of UE in a D2D half-duplex system in monitoring each other in the related technology is solved, and the effect of implementing effective mutual monitoring of the UE in the D2D half-duplex system is further achieved.

BRIEF DESCRIPTION OF THE DRAWINGS

The drawings described here are adopted to provide further understanding to the present disclosure, and form a part of the present disclosure. Schematic embodiments of the present disclosure and descriptions thereof are adopted to explain the present disclosure and not intended to form improper limits to the present disclosure. In the drawings:

FIG. 15 is a form diagram of a first SA pattern according to example embodiment 1 of the present disclosure;

FIG. 16 is a form diagram of a second SA pattern according to example embodiment 1 of the present disclosure;

FIG. 17 is a form diagram of a first SA pattern according to example embodiment 1 of the present disclosure;

FIG. 18 is a form diagram of a second SA pattern according to example embodiment 1 of the present disclosure;

FIG. 19 is a form diagram of a first SA pattern according to example embodiment 1 of the present disclosure;

FIG. 22 is a schematic diagram of an RU with 2 more time-domain sub-frames than frequency-domain sub-frames according to example embodiment 3 of the present disclosure;

FIG. 23 is a schematic diagram of an RU of which a time domain is twice a frequency domain according to example embodiment 3 of the present disclosure;

FIG. 25(a) is a first schematic diagram of a mode of four transmission according to an example embodiment of the present disclosure;

FIG. 25(b) is a second schematic diagram of a mode of four transmission according to an example embodiment of the present disclosure.

DETAILED DESCRIPTION OF THE EMBODIMENTS

The present disclosure will be described below with reference to the drawings and embodiments in detail. It is important to note that the embodiments in the present disclosure and characteristics in the embodiments may be combined under the condition of no conflicts.

Figure 2:
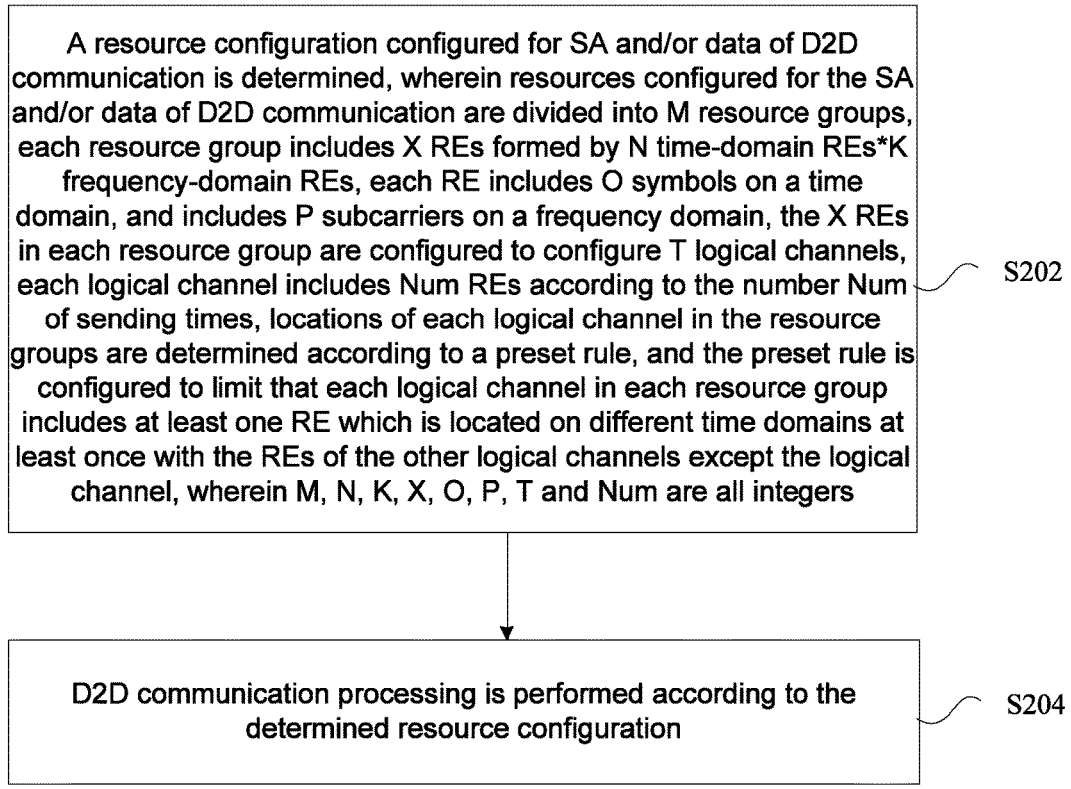
FIG. 2 is a flowchart of a first method for processing D2D communication according to an embodiment of the present disclosure.

The embodiment provides a method for processing D2D communication. FIG. 2 is a flowchart of a first method for processing D2D communication according to an embodiment of the present disclosure. As shown in FIG. 2, the flow includes the following steps.

Step S202: a resource configuration configured for SA and/or data of D2D communication is determined, wherein resources configured for the SA and/or data of D2D communication are divided into M resource groups, each resource group includes X RUs formed by N time-domain RUs*K frequency-domain RUs, each RU includes O symbols on a time domain, and includes P subcarriers on a frequency domain, the X RUs in each resource group are configured to configure T logical channels, each logical channel includes Num RUs according to the number Num of sending times, locations of each logical channel in the resource groups are determined according to a preset rule, and the preset rule is configured to limit that each logical channel in a resource group includes at least one RU which is located on different time domains at least once with the RUs of the other logical channels in the resource group, wherein M, N, K, X, O, P, T and Num are all integers.

Step S204: D2D communication processing is performed according to the determined resource configuration. For example, resource selection may be performed according to the determined resource configuration, that is, a resource group and a logical channel of the resource group are determined, and D2D communication processing is performed on the selected logical channel.

By the steps, by the resource configuration for the SA and/or data of D2D communication, the problem of incapability of UE in a D2D half-duplex system in monitoring each other in the related technology is solved, and the effect of implementing effective mutual monitoring of the UE in the D2D half-duplex system is further achieved.

When the resource configuration for the SA and/or data of D2D communication is determined, multiple manners may be adopted according to whether coverage of an eNodeB exists or not. For example, under the condition of existence of the coverage of the eNodeB, the resource configuration, i.e. the resource groups and the logical channels, configured for the SA and/or data of D2D communication may be directly received from the eNodeB to determine a physical resource for the SA and/or the data. For another example, under the condition of no coverage of the eNodeB, resources configured for D2D communication may be monitored, and the resource configuration, i.e. the resource groups and the logical channels, configured for the SA and/or data of D2D communication is determined to determine the physical resource for the SA and/or the data according to a monitoring result, and information about a resource group to be added and an occupation condition of logical channels in the resource group are obtained by monitoring. That is, for users of different modes, according to a resource division manner, for a user of Mode 1, the eNodeB configures a resource for the D2D user through a resource group and sequence numbers of a physical resource according to the resource configuration, and for a user of Mode 2, the user selects a resource group and sequence numbers of a physical resource according to a user group selected for monitoring and an idle condition of the user group.

In an example embodiment, when the resource configuration configured for the SA and/or data of D2D communication is determined, different processing manners may be adopted according to different specific conditions. For example, under the condition that the preset rule is that the number N of the time-domain RUs in a resource group is larger than the number K of the frequency-domain RUs or the number N of the time-domain RUs in a resource group is equal to the number K of the frequency-domain RUs, it is configured that physical resources of the logical channels located in the same sub-frame during first transmission are located in different sub-frames at least once during retransmission. While the operation that it is configured that the physical resources of the logical channels located in the same sub-frame during first transmission are located in different sub-frames at least once during retransmission under the condition that the number N of the time-domain RUs in each resource group is equal to the number K of the frequency-domain RUs may adopt the following processing manner: a matrix and corresponding logical channel sequence numbers for the RUs in the resource groups are constructed according to the numbers of the time/frequency-domain RUs, and it is configured that a sequence number is selected for sending according to a physical resource corresponding to the matrix sequence number during first transmission and for sending according to a physical resource corresponding to the sequence in a transposed matrix of the matrix during retransmission.

It is important to note that the frequency-domain RUs in the resource groups are continuously allocated, or are allocated at equal intervals; and the time-domain RUs in the resource groups are continuously allocated, or are allocated at equal intervals.

When the locations of each logical channel in the resource groups are determined according to the preset rule, the preset rule may be determined in multiple manners. For example, the preset rule limits in the following manner that each logical channel in a resource group includes at least one RU which is located on different time domains at least once with the RUs of the other logical channels in the resource group: Step 1: numbers 1, 2, 3, . . . k*(m+1)/2 are put into cells numbered as (k, m) according to a following formula:

$$x(k, m) = m + \sum_{i=1}^{k} (\max(subn) - i + 1) \cdot \min(1, (i-1)),$$

where a row number is k, k>=1 and k<=max(subn)−1, a column number is m, m>=1 and m<=max(subn)−1, it is restricted that k+m<=max(subn), i is a natural number, max(subn) is a maximum time-domain SA physical unit number within an SA resource period, and min(1, (i−1)) adopts a relatively smaller value in 1, (i−1); Step 2: max(subn) numbers in the cells (k, m) are read in the following manner: for the first time, a first column is started to be read from the cell of k=1 and m=1, then k=1 and a (max(subn)−1)th column are read, and the read numbers are sequentially filled into a first row of [1, m+1], that is, k=1; for the second time, m is automatically increased by 1, a second column is started to be read from the cell of k=1 and m=2, then k=1 and a (max(subn)−m)th column are read, and the read numbers are sequentially filled into a second row of [2, m+1], that is, k=2, . . . ; k=1 and an (m=RoundU(max(subn)−1)/2)th column are continued to be read according to the same method, k=1 and numbers corresponding to an (m=RoundD (max(subn)−1)/2+1)th column are read, where RoundD is rounding down and RoundU is rounding up, and the read numbers are sequentially filled into a (RoundU(max(subn)−1/2)th row of [RoundU(max(subn)−1/2, m+1]; then according to a reverse sequence, for the first time, the first column is started to be read from the cell of k=1 and m=RoundD (max(subn)−1)/2+1, then k=1 and an (m=RoundU(max (subn)−1)/2)th column are read, and the read numbers are sequentially filled into a row of [RoundU(max(subn)−1/2+1, m+1], . . . ; then the second column is read according to a reading sequence of k=1 and m=max(subn)−2, then k=1 and the cell column of m=2 are read, and the read numbers are sequentially filled into the second last row of [k, m+1]; and k=1 and an (m=max(subn)−1)th column are sequentially read, then k=1 and the cell column of m=1 are read, and the read numbers are sequentially filled into the last row of [k, m+1].

In addition, when SA sub-frames are more than SA patterns, there may exist repetitions, that is, that the preset rule limits that each logical channel in a resource group includes at least one RU which is located on different time domains at least once with the RUs of the other logical channels in the resource group in the abovementioned manner may be repeated by adopting the following formula: x(k, m)=1+mod((4*(m−1)+k−1),5), where mod is a modulus operation.

In an example embodiment, when D2D communication processing is performed according to the determined resource configuration, the following example processing manner may also be adopted: resource selection is performed according to a resource group indication about a resource group and a logical channel indication about a logical channel corresponding to the resource group in the determined resource configuration; and D2D communication processing is performed according to a selected resource.

Figure 3:
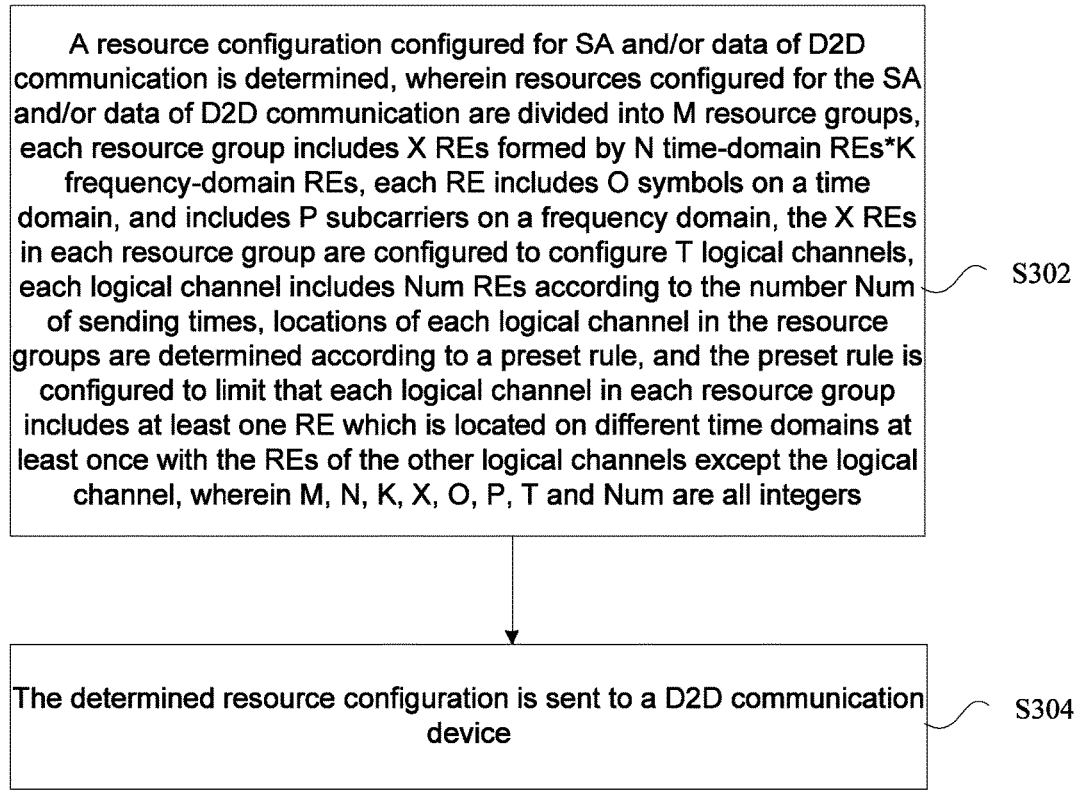
FIG. 3 is a flowchart of a second method for processing D2D communication according to an embodiment of the present disclosure.

FIG. 3 is a flowchart of a second method for processing D2D communication according to an embodiment of the present disclosure, and as shown in FIG. 3, the flow includes the following steps.

Step S302: a resource configuration configured for SA and/or data of D2D communication is determined, wherein resources configured for the SA and/or data of D2D communication are divided into M resource groups, each resource group includes X RUs formed by N time-domain RUs*K frequency-domain RUs, each RU includes O symbols on a time domain, and includes P subcarriers on a frequency domain, the X RUs in each resource group are configured to configure T logical channels, each logical channel includes Num RUs according to the number Num of sending times, locations of each logical channel in the resource groups are determined according to a preset rule, and the preset rule is configured to limit that each logical channel in a resource group includes at least one RU which is located on different time domains at least once with the RUs of the other logical channels in the resource group, wherein M, N, K, X, O, P, T and Num are all integers.

Step S304: the determined resource configuration is sent to a D2D communication device.

By the steps, by the resource configuration for the SA and/or data of D2D communication, the problem of incapability of UE in a D2D half-duplex system in monitoring each other in the related technology is solved, and the effect of implementing effective mutual monitoring of the UE in the D2D half-duplex system is further achieved.

Corresponding to an eNodeB side, when the resource configuration configured for the SA and/or data of D2D communication is determined, the following processing may be adopted: under the condition that the preset rule is that the number N of the time-domain RUs in the resource group is larger than the number K of the frequency-domain RUs or the number N of the time-domain RUs in the resource group is equal to the number K of the frequency-domain RUs, it is configured that physical resources of the logical channels located in the same sub-frame during first transmission are located in different sub-frames at least once during retransmission.

Similarly, the operation that it is configured that the physical resources of the logical channels located in the same sub-frame during first transmission are located in different sub-frames at least once during retransmission under the condition that the number N of the time-domain RUs in each resource group is equal to the number K of the frequency-domain RUs includes that: a matrix and corresponding logical channel sequence numbers are constructed for the RUs in the resource groups according to the numbers of the time/frequency-domain RUs, and it is configured that a sequence number is selected for sending according to a physical resource corresponding to the matrix sequence number during first transmission and for sending according to a physical resource corresponding to the sequence in a transposed matrix of the matrix during retransmission.

Correspondingly, the same manner may also be adopted on the eNodeB side to implement a limiting operation of the preset rule, that is, the preset rule may also limit in the following manner that each logical channel in a resource group includes at least one RU which is located on different time domains at least once with the RUs of the other logical channels in the resource group: Step 1: numbers 1, 2, 3, . . . k*(m+1)/2 are put into cells numbered as (K m) through the following formula:

$$x(k, m) = m + \sum_{i=1}^{k} (\max(subn) - i + 1) \cdot \min(1, (i-1)),$$

where a row number is k, k>=1 and k<=max(subn)−1, a column number is m, m>=1 and m<=max(subn)−1, it is restricted that k+m<=max(subn), i is a natural number, max(subn) is a maximum time-domain SA physical unit number within an SA resource period, and min(1, (i−1)) adopts a relatively smaller value in 1, (i−1); Step 2: max (subn) numbers in the cells (k, m) are read in the following manner: for the first time, a first column is started to be read from the cell of k=1 and m=1, then k=1 and a (max(subn)−1)th column are read, and the read numbers are sequentially filled into a first row of [1, m+1], that is, k=1; for the second time, m is automatically increased by 1, a second column is started to be read from the cell of k=1 and m=2, then k=1 and a (max(subn)−m)th column are read, and the read numbers are sequentially filled into a second row of [2, m+1], that is, k=2, . . . ; k=1 and an (m=RoundU(max(subn)−1)/2)th column are read according to the same method, k=1 and numbers corresponding to an (m=RoundD(max(subn)−1)/2+1)th column are read, where RoundD is rounding down and RoundU is rounding up, and the read numbers are sequentially filled into a (RoundU(max(subn)−1/2)th row of [RoundU(max(subn)−1/2, m+1]; then according to a reverse sequence, for the first time, the first column is started to be read from the cell of k=1 and m=RoundD(max(subn)−1)/2+1, then k=1 and an (m=RoundU(max(subn)−1)/2)th column are read, and the read numbers are sequentially filled into a row of [RoundU(max(subn)−1/2+1, m+1], . . . ; then the second column is read according to a reading sequence of k=1 and m=max(subn)−2, then k=1 and the cell column of m=2 are read, and the read numbers are sequentially filled into the second last row of [k, m+1]; and k=1 and an (m=max(subn)−1)th column are sequentially read, then k=1 and the cell column of m=1 are read, and the read numbers are sequentially filled into the last row of [k, m+1].

Similarly, that the preset rule limits that each logical channel in a resource group includes at least one RU which is located on different time domains at least once with the RUs of the other logical channels in the resource group in the abovementioned manner may also be repeated by adopting the following formula: x(k, m)=1+mod((4*(m−1)+k−1), 5), where mod is a modulus operation.

Corresponding to the eNodeB side, when the determined resource configuration is sent to the D2D communication device, a resource group and a logical channel corresponding to the resource group in the determined resource configuration may be indicated at first, and then an eNodeB sends the resource configuration including a resource group indication which indicates the resource group and a logical channel indication which indicates the logical channel corresponding to the resource group in the resource configuration is sent to the D2D communication device. By the processing, the D2D communication device is rapidly and efficiently indicated to select a resource for D2D communication processing.

The embodiment also provides a device for processing D2D communication, which is configured to implement the abovementioned embodiments and example implementation modes, that what has been described will not be elaborated. For example, term "component", used below, may be a combination of software and/or hardware capable of realizing a preset function. Although the device described in the following embodiment is preferably implemented with software, implementation with hardware or a combination of the software and the hardware is also possible and conceivable.

Figure 4:
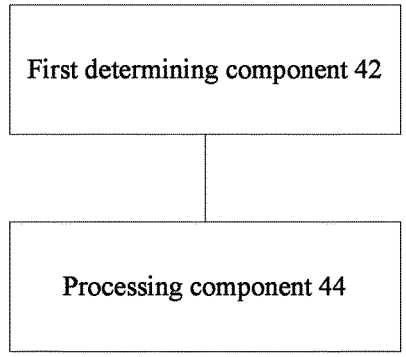
FIG. 4 is a structure block diagram of a first device for processing D2D communication according to an embodiment of the present disclosure.

FIG. 4 is a structure block diagram of a first device for processing D2D communication according to an embodiment of the present disclosure, and as shown in FIG. 4, the device includes a first determining component 42 and a processing component 44. The device will be described below.

The first determining component 42 is configured to determine a resource configuration configured for SA and/or data of D2D communication, wherein resources configured for the SA and/or data of D2D communication are divided into M resource groups, each resource group includes X RUs formed by N time-domain RUs*K frequency-domain RUs, each RU includes O symbols on a time domain, and includes P subcarriers on a frequency domain, the X RUs in each resource group are configured to configure T logical channels, each logical channel includes Num RUs according to the number Num of sending times, locations of each logical channel in the resource groups are determined according to a preset rule, and the preset rule is configured to limit that each logical channel in a resource group includes at least one RU which is located on different time domains at least once with the RUs of the other logical channels in the resource group, wherein M, N, K, X, O, P, T and Num are all integers; and the processing component 44 is connected to the first determining component 42, and is configured to perform D2D communication processing according to the determined resource configuration.

Figure 5:
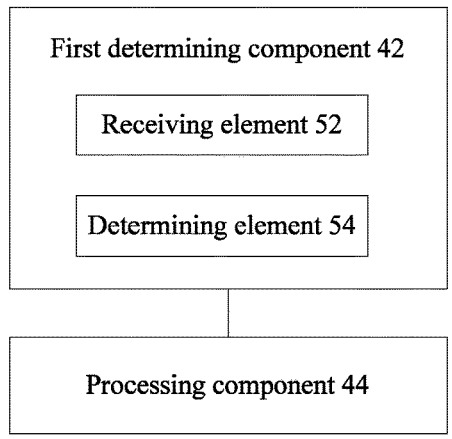
FIG. 5 is a first example structure block diagram of a first determining component 42 in a first device for processing D2D communication according to an embodiment of the present disclosure.

FIG. 5 is a first example structure block diagram of a first determining component 42 in a first device for processing D2D communication according to an embodiment of the present disclosure. As shown in FIG. 5, the first determining component 42 includes at least one of: a receiving element 52 and a determination module 54. The first determining component 42 will be described below.

The receiving element 52 is configured to receive the resource configuration configured for the SA and/or data of D2D communication from an eNodeB; and the determining element 54 is configured to monitor resources configured for D2D communication, and determine the resource configuration configured for the SA and/or data of D2D communication according to a monitoring result.

Figure 6:
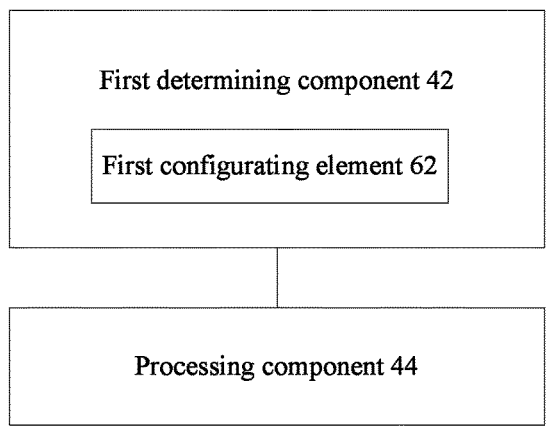
FIG. 6 is a second example structure block diagram of a first determining component 42 in a first device for processing D2D communication according to an embodiment of the present disclosure.

FIG. 6 is a second example structure block diagram of a first determining component 42 in a first device for processing D2D communication according to an embodiment of the present disclosure. As shown in FIG. 6, the first determining component 41 includes a first configurating element 62. The first determining component 42 will be described below.

The first configurating element 62 is configured to, under the condition that the preset rule is that the number N of the time-domain RUs in each resource group is larger than the number K of the frequency-domain RUs or the number N of the time-domain RUs in each resource group is equal to the number K of the frequency-domain RUs, configure that physical resources of the logical channels located in the same sub-frame during first transmission are located in different sub-frames at least once during retransmission.

Figure 7:
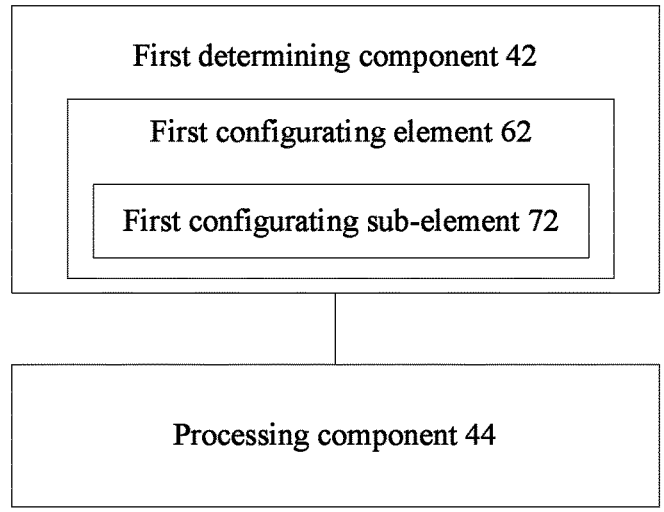
FIG. 7 is an example structure block diagram of a first configurating element 62 in a first determining component 42 in a first device for processing D2D communication according to an embodiment of the present disclosure.

FIG. 7 is an example structure block diagram of a first configurating element 62 in a first determining component 42 in a first device for processing D2D communication according to an embodiment of the present disclosure. As shown in FIG. 7, the first configurating element 62 includes: a first configurating sub-element 72. The first configurating sub-element 72 will be described below.

The first configurating sub-element 72 is configured to construct a matrix and corresponding logical channel sequence numbers for the RUs in the resource groups according to the numbers of the time/frequency-domain RUs, and configure that a sequence number is selected for sending according to a physical resource corresponding to the matrix sequence number during first transmission and for sending according to a physical resource corresponding to the sequence in a transposed matrix of the matrix during retransmission.

Figure 8:
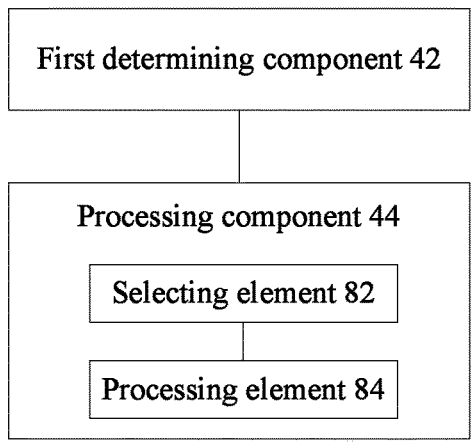
FIG. 8 is an example structure block diagram of a processing component 44 in a first device for processing D2D communication according to an embodiment of the present disclosure.

FIG. 8 is an example structure block diagram of a processing component 44 in a first device for processing D2D communication according to an embodiment of the present disclosure. As shown in FIG. 8, the processing component includes: a selecting element 82 and a processing element 84. The processing component 44 will be described below.

The selecting element 82 is configured to perform resource selection according to a resource group indication about a resource group and a logical channel indication about a logical channel corresponding to the resource group in the determined resource configuration; and the processing element 84 is connected to the selecting element 82, and is configured to perform D2D communication processing according to a selected resource.

Figure 9:
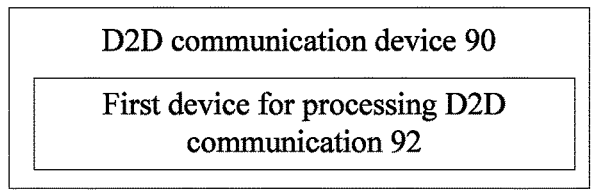
FIG. 9 is a structure block diagram of a D2D communication device according to an embodiment of the present disclosure.

FIG. 9 is a structure block diagram of a D2D communication device according to an embodiment of the present disclosure. As shown in FIG. 9, the D2D communication device 90 includes any abovementioned first device for processing D2D communication 92.

Figure 10:
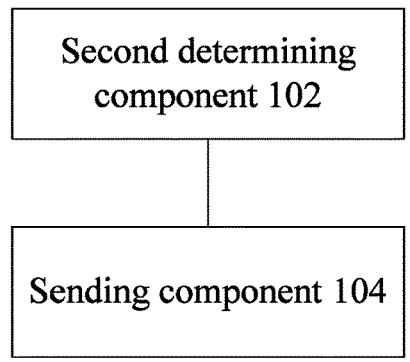
FIG. 10 is a structure block diagram of a second device for processing D2D communication according to an embodiment of the present disclosure.

FIG. 10 is a structure block diagram of a second device for processing D2D communication according to an embodiment of the present disclosure. As shown in FIG. 10, the device includes: a second determining component 102 and a sending component 104. The device will be described below.

The second determining component 102 is configured to determine a resource configuration configured for SA and/or data of D2D communication, wherein resources configured for the SA and/or data of D2D communication are divided into M resource groups, each resource group includes X RUs formed by N time-domain RUs*K frequency-domain RUs, each RU includes O symbols on a time domain, and includes P subcarriers on a frequency domain, the X RUs in each resource group are configured to configure T logical channels, each logical channel includes Num RUs according to a number Num of sending times, locations of each logical channel in the resource groups are determined according to a preset rule, and the preset rule is configured to limit that each logical channel in a resource group includes at least one RU which is located on different time domains at least once with the RUs of the other logical channels in the resource group, wherein M, N, K, X, O, P, T and Num are all integers; and the sending component 104 is connected to the second determining component 102, and is configured to send the determined resource configuration to a D2D communication device.

Figure 11:
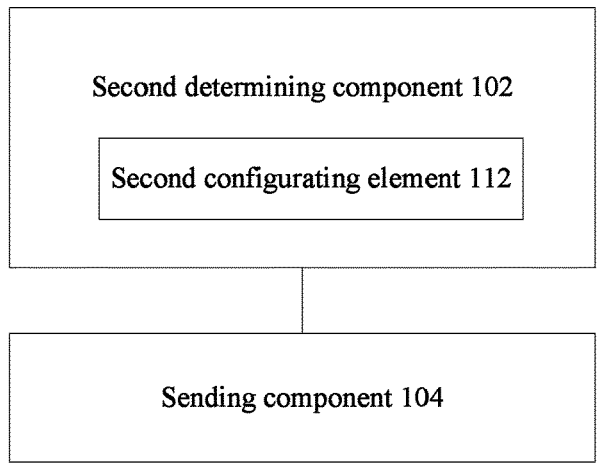
FIG. 11 is an example structure block diagram of a second determining component 102 in a second device for processing D2D communication according to an embodiment of the present disclosure.

FIG. 11 is an example structure block diagram of a second determining component 102 in a second device for processing D2D communication according to an embodiment of the present disclosure. As shown in FIG. 11, the second determining component includes a second configurating element 112. The second configurating element 112 will be described below.

The second configurating element 112 is configured to, under the condition that the preset rule is that the number N of the time-domain RUs in each resource group is larger than the number K of the frequency-domain RUs or the number N of the time-domain RUs in each resource group is equal to the number K of the frequency-domain RUs, configure that physical resources of the logical channels located in the same sub-frame during first transmission are located in different sub-frames at least once during retransmission.

Figure 12:
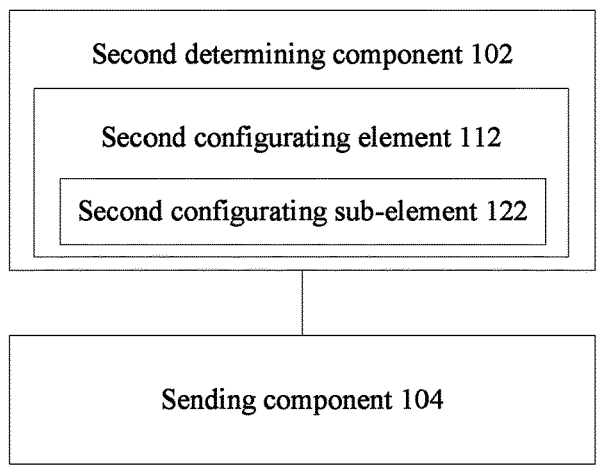
FIG. 12 is an example structure block diagram of a second configurating element 112 in a second determining component 102 in a second device for processing D2D communication according to an embodiment of the present disclosure.

FIG. 12 is an example structure block diagram of a second configurating element 112 in a second determining component 102 in a second device for processing D2D communication according to an embodiment of the present disclosure. As shown in FIG. 12, the second configurating element 112 includes: a second configurating sub-element 122. The second configurating sub-element 122 will be described below.

The second configurating sub-element 122 is configured to construct a matrix and corresponding logical channel sequence numbers for the RUs in the resource groups according to the numbers of the time/frequency-domain RUs, and configure that a sequence number is selected for sending according to a physical resource corresponding to the matrix sequence number during first transmission and for sending according to a physical resource corresponding to the sequence in a transposed matrix of the matrix during retransmission.

Figure 13:
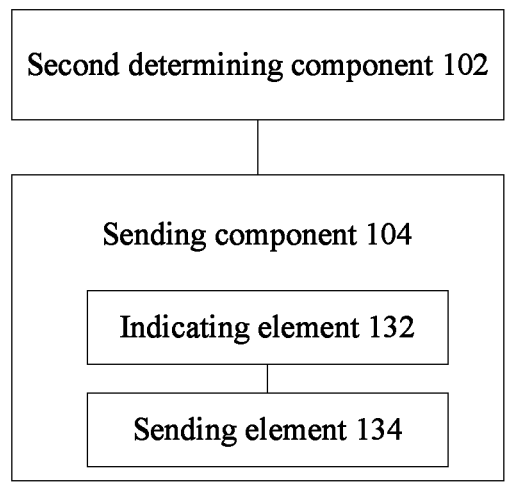
FIG. 13 is an example structure block diagram of a sending component 104 in a second device for processing D2D communication according to an embodiment of the present disclosure.

FIG. 13 is an example structure block diagram of a sending component 104 in a second device for processing D2D communication according to an embodiment of the present disclosure. As shown in FIG. 13, the sending component 104 includes: an indicating element 132 and a sending element 134. The sending component 104 will be described below.

The indicating element 132 is configured to indicate a resource group and a logical channel corresponding to the resource group in the determined resource configuration; and the sending element 134 is connected to the indicating element 132, and is configured to send the resource configuration including a resource group indication which indicates the resource group and a logical channel indication which indicates the logical channel corresponding to the resource group in the resource configuration to the D2D communication device.

Figure 14:
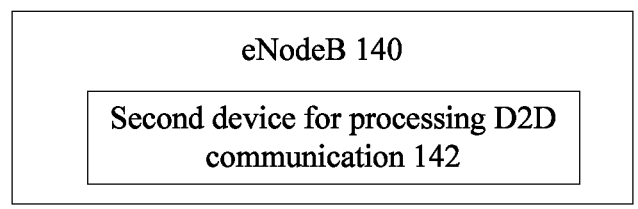
FIG. 14 is a structure block diagram of an eNodeB according to an embodiment of the present disclosure.

FIG. 14 is a structure block diagram of an eNodeB according to an embodiment of the present disclosure. As shown in FIG. 14, the eNodeB 140 includes any abovementioned second device for processing D2D communication 142.

D2D is divided into conventional eNodeB covered and uncovered modes, and under coverage, an eNodeB configures a scheduling D2D resource and data communication resource for D2D; and in an uncovered scenario, the scheduling D2D resource and data communication resource for D2D are pre-configured. Since a D2D system works in a half-duplex manner, for example, two users who initiate services at the same time may not receive each other, and particularly for the same user group, such as a user group in a scenario of fire, medical treatment, disaster relief and the like, received information loss is caused by mutual monitoring capability. In addition, for broadcast communication, users are at different locations, and there is no feedback. Therefore, it is very important to improve link reliability to achieve a link target.

Therefore, for the problem of incapability of UE in a communication scenario in monitoring each other due to the problem of a halt-duplex problem in the related technology, the embodiment provides a resource allocation method. By the method, the problem of incapability of the UE in monitoring each other during D2D communication due to the half-duplex problem may be effectively solved, and meanwhile, link reliability is improved by retransmission to achieve a link target. It is important to note that within coverage, an eNodeB may indicate an SA resource by index indication and a frequency-domain block sequence number, and in an uncovered scenario, the SA resource may be selected by competition. The method includes the following processing.

1) A configured resource pool is divided into M resource groups, each resource group includes a plurality of RUs and each RU including one sub-frame (or part of symbols of one sub-frame, or multiple sub-frames) on a time domain and including a Resource Block (RB) (or two RBs, or multiple RBs) on a frequency domain. Each resource group includes N (N RUs on the time domain)*K (K RUs on the frequency domain) RUs. The N*K RUs in each resource group configure T logical channels, each logical channel includes Num RUs according to the number Num of sending times, and locations of the Num RUs in each logical channel (index i) in the resource groups are set according to a certain rule to ensure mutual monitoring, that is, the logical channel (index i) in the resource group includes at least one RU (i) which is located on different time-domain channels with the other logical channels (T−1 logical channels except channel i).

2) Wherein, the design rule includes that the number N of the time-domain RUs of the resource group is larger than the number K of the frequency-domain RUs and the resources located in the same sub-frame index during first transmission are located in different sub-frames during retransmission.

Example 1: the number of the time-domain RUs is N=5, the number of the frequency-domain RUs is K=4, each resource group has 20 RUs and T=10 logical channels, the number of sending times of each logical channel is Num=2, 4 channels set to be index(1), index(2), index(3) and index (4) are sent in the first time-domain RU N=1 during first transmission, the four channels are located at any frequency-domain locations of 4 time-domain RUs N=2, 3, 4, 5 after them during retransmission, and a second sub-frame occupies physical units, set to be index(5), index(6) and index(7), except the channels for retransmission of the first sub-frame for first transmission. During retransmission, the three channels are located at any frequency-domain locations of three time-domain units after the occupied units except the channels index (1, 2, 3, 4) and retransmission channels occupied by the first sub-frame N=1, and by parity of reasoning, a physical resource index distribution of the resource groups is obtained.

3) A design rule includes that the number N of the time-domain RUs in the resource group is equal to the number K of the frequency-domain RUs.

In example 3, the RUs of the resource groups form a matrix A [N,K] according to time-frequency sequence numbers index for the first time, and a transposed matrix $A^T$ of A is sent during retransmission.

4) Wherein, the frequency-domain physical RUs of the resource groups may be continuously allocated, and may also be allocated at equal intervals.

5) Wherein, the multiple resource groups may be within a scheduling period, and may also be within multiple scheduling periods, and their time-frequency RUs may be continuous sub-frames, and may also be discontinuous sub-frames.

6) Wherein, according to an indication method for the T logical channels, within coverage, the eNodeB configures the resource group M and the logical channel index i, and beyond coverage, Tx UE of a user selects the resource group M and the logical channel index i.

7) The number of RBs configured in an allocated bandwidth is divided by (the K frequency-domain RUs*the number of RBs included in each resource) to obtain an integer which is the number M of the resource groups, all frequency-domain resources are completely allocated when a remainder R=0, and when the remainder R is not 0 and R<M, for the remaining RUs, when the remainder is 1, that is, R=1, the remaining RU is occupied by one user, and when the remainder is R, the RUs are allocated to R users, or are used as other channels.

Corresponding to the abovementioned resource configuration solution, the embodiment also provides a D2D resource configuration device, which includes the following components.

For Mode 1, the device includes an eNodeB, and a mobile terminal intended to send a D2D message, wherein the eNodeB includes a resource scheduling component and a message sending device, and the D2D mobile terminal includes a resource request unit, a message receiving element and a sending component.

For Mode 2, the device includes a mobile terminal intended to send a D2D message, which includes a monitoring component, a resource selection component and a sending component.

By the D2D SA pattern designing solution listed by the abovementioned embodiment and example implementation mode, the problem that control channel designing or SA indication is particularly important during broadcast communication, particularly D2D broadcast communication, and information may be omitted due to incapability of receiving the information of each other due to a half-duplex mode is effectively solved. By control channel or SA pattern designing, the problem of incapability in mutual reception in a group is solved, and meanwhile, frequency and time-domain diversity gains are increased by a retransmission pattern. In addition, a D2D SA design concept may also be promoted in a D2D standard conference to fill in design gaps.

A D2D SA or control message transmission solution of the example embodiment of the present disclosure will be described below with examples.

Figure 1:
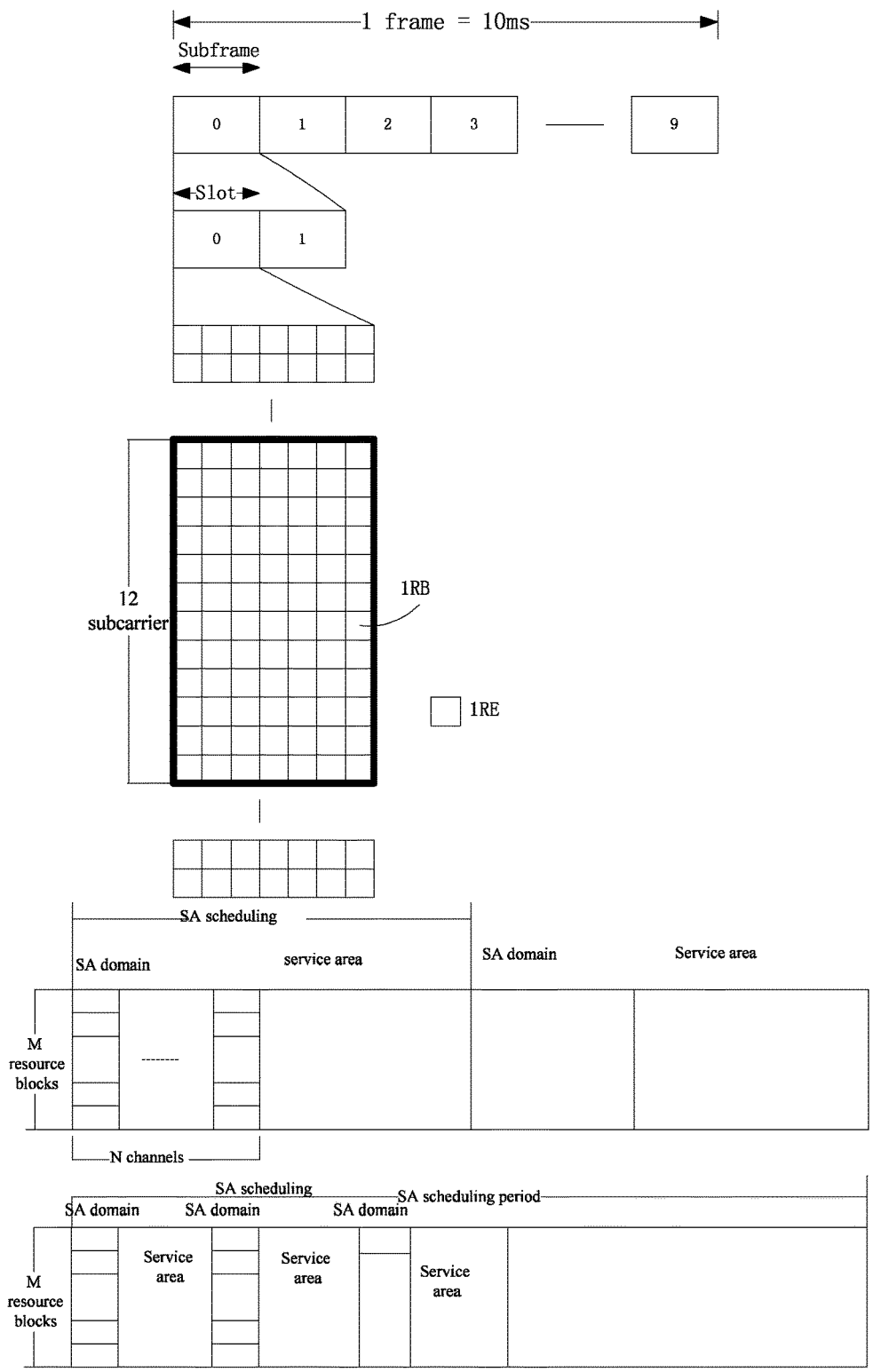
FIG. 1 is a schematic diagram of resource indication and a relationship between an SA field and a data field in the related technology.

In an Orthogonal Frequency Division Multiple Access/Single-Carrier Frequency Division Multiple Access (OFDMA/SC-FDMA) system, a radio resource for communication is in a time-frequency two-dimensional form. For example, for a Long Term Evolution/Long Term Evolution-Advanced (LTE/LTE-A) system, communication resources of an uplink and a downlink are all divided by taking a radio frame as a unit in a time direction, each radio frame has a length of 10 ms, and includes 10 sub-frames with lengths of 1 ms, and each sub-frame includes two slots with lengths of 0.5 ms, as shown in FIG. 1. According to different configurations of Cyclic Prefixes (CPs), each slot may include 6 or 7 Orthogonal Frequency Division Multiplexing (OFDM) or Single-Carrier Frequency Division Multiplexing (SC-FDM) symbols.

In a frequency direction, resources are divided by taking a subcarrier as a unit. In communication, a minimum unit for frequency-domain resource allocation is an RB, corresponding to one PRB of a physical resource. A PRB includes 12 subcarriers in the frequency domain, and corresponds to a slot in the time domain. Resources corresponding to one subcarrier on each OFDM/SC-FDM symbol form an RE. Resource indication is to determine a radio resource under combined indication of a time-domain sub-frame and a frequency-domain PRB.

Configured D2D resources are further divided into SA fields or control fields and data service areas. SA fields and data fields are included in one scheduling period, the SA fields may be continuous sub-frames, and may also be discontinuous sub-frames, like FIG. 24 corresponding to the embodiment described later. Since scheduling and demodulation control information is substantially consistent in size for each user, the SA fields are divided into basic physical units or SA channels, such as 1 to 2 frequency-domain PRB pairs, a time-domain one sub-frame or part of symbols of one sub-frame, wherein other symbols is configured for synchronization channels or other channels, or a guard GAP for receiving and sending switching is eliminated. That is, Frequency Division Multiplexing (FDM) of the basic physical units is implemented on the frequency domain, the basic physical units may be divided into 0~P SA channels according to sequence numbers from a low frequency to a high frequency, and the SA channels temporally occupy part of sub-frames or one sub-frame or multiple sub-frames. In order to simplify description, occupation of one sub-frame is taken as an example in the embodiment. In one scheduling period, 0~P SA channels are included on the frequency channel, 1~N sub-frames, i.e. 1~N time-domain SA channels are included on the time domain, time-domain and frequency-domain resources of one or more SA or control channels form SA fields. 0~P frequency domains may further be divided into M frequency-domain resource index blocks, each SA channel in the SA fields may be retransmitted, and number of sending times of the SA channels may be 1, 2, 4 and 8, wherein the number of sending times may be configured by a system or obtained through a system message. That is, according to a size of each SA field, N includes one or more time-domain SA channels, M includes one or more frequency-domain SA channels, and P/M*N forms a resource index block. An innovation involved here is mainly based on resource group designing, descriptions are made in the listed embodiments with the condition that an SA channel occupies one sub-frame, that is, the number of sub-frames is the number of time-domain SA channels, and one to two frequency-domain PRB pair form an SA channel as an example, and the number of sub-frames occupied the SA channels may be within one scheduling period, and may also be within multiple scheduling periods.

Example embodiments of the present disclosure will be described below with reference to listed parameters.

Example Embodiment 1

In each SA period, the number of frequency-domain channels of SA is configured according to the number of time-domain SA channels.

The number of time-domain SA sub-frames is N, the number of the frequency-domain channels is configured to be N-1, retransmission is performed once, and a resource group is [N, N-1].

When the number of the time-domain sub-frames is 5, the number of the frequency-domain SA channels is 4.

For an SA channel sent for the first time, a sub-frame for retransmission is not the same sub-frame with a sub-frame channel for first transmission.

When the number of the frequency-domain channels is 4, the SA channels 1, 2, 3 and 4 of a first frame are marked to be sent for the first time, 1, 2, 3 and 4 are required to be distributed in second, third, fourth and fifth sub-frames during retransmission, then first transmission sequence numbers of SA channels 5, 6 and 7 are set in idle resources of a second frame, retransmitted 5, 6 and 7 are distributed in the third, fourth and fifth sub-frames after them, and in order to ensure frequency hopping and time diversity gain of retransmission, a time-frequency interval between retransmission and first transmission is as large as possible.

It is important to note that multiple SA patterns may be included in the example embodiment 1, which are represented below in form of schematic diagram.

Figures 20, 21:
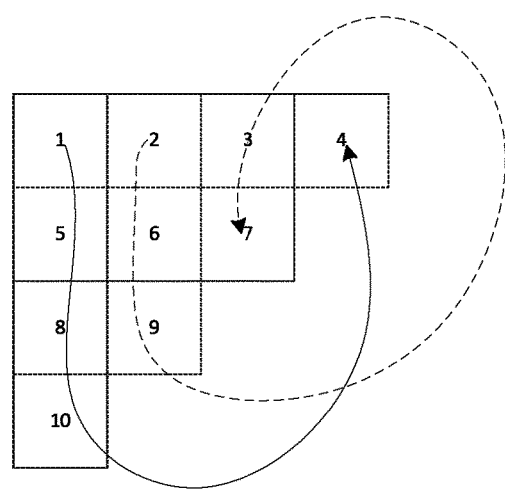
FIG. 20 is a form diagram of a second SA pattern according to example embodiment 1 of the present disclosure.
FIG. 21 is a schematic diagram of reading corresponding numbers for the first time and the second time in Step 2 for acquiring an SA pattern in FIG. 18 according to example embodiment 1 of the present disclosure.

FIG. 15 is a form diagram of a first SA pattern according to example embodiment 1 of the present disclosure, as shown in FIG. 15;

FIG. 16 is a form diagram of a second SA pattern according to example embodiment 2 of the present disclosure, as shown in FIG. 16;

FIG. 17 is a form diagram of a first SA pattern according to example embodiment 1 of the present disclosure, as shown in FIG. 17;

FIG. 18 is a form diagram of a second SA pattern according to example embodiment 2 of the present disclosure, as shown in FIG. 18;

FIG. 19 is a form diagram of a first SA pattern according to example embodiment 1 of the present disclosure, as shown in FIG. 19;

FIG. 20 is a form diagram of a second SA pattern according to example embodiment 2 of the present disclosure, as shown in FIG. 20.

The example embodiment 1 will be described with FIG. 18 as an example.

The SA pattern shown in FIG. 18 may be obtained in the following manner.

It is supposed that the serial number of a row is k, k>=1 and k<=4, the serial number of a column is m, m>=1 and m<=4, and corresponding to the abovementioned formula $$x(k, m) = m + \sum_{i=1}^{k} (\max(subn) - i + 1) \cdot \min(1, (i-1)),$$

at this moment, max(subn) is 5, that is, the formula is changed into $$x(k, m) = m + \sum_{i=1}^{k} (4 - i + 2) \cdot \min(1, (i-1)).$$

Step 1: numbers 1, 2, 3, ..., 9 and 10 are put into cells numbered as (k, m). A method is that numerical values $$x(k, m) = m + \sum_{i=1}^{k} (4 - i + 2) \cdot \min(1, (i - 1))$$

are put into the cells (k, m), and min( ) represents that a relatively smaller one in the two is adopted.

Step 2: 5 numbers of the cells (K m) are read. A method is that: for the first time, a first column is started to be read from the cell with the smallest k and the smallest m, and then a (5−m)th column is read; and for the second time, m is automatically increased by 1 (that is, m adopts 2), the first column is started to be read from the cell with the smallest k and the smallest m, and then the (5−m)th column (that is the third column) is read. The other two rows are reversely read (the (5−m)th column is read at first, and then the mth column is read). Wherein, FIG. 21 is a schematic diagram of reading corresponding numbers for the first time and the second time in Step 2 for acquiring an SA pattern in FIG. 18 according to example embodiment 1 of the present disclosure, and as shown in FIG. 21, numbers corresponding to full lines are read for the first time, and numbers corresponding to dotted lines are read for the second time. Step 3: the read numbers are written into a new table (a table with 4 rows and 5 columns). The numbers read in Step 2 are sequentially written into the new table. It is supposed that the serial number of a row is p, p>=1 and p<=4, and the serial number of a column is n, n>=1 and n<=5, the nth number read at the pth time are written into cells (p, n).

Example Embodiment 2

In each SA period, the number of frequency-domain channels of SA is configured according to the number of time-domain sub-frames.

The number of the time-domain SA sub-frames is N, the number of channels on the frequency-domain channels is configured to be N−2, a resource group is [N, N−2], and retransmission is performed once.

When the number of the time-domain sub-frames is 6, the number of the frequency-domain SA channels is 4.

For an SA channel sent for the first time, a sub-frame for retransmission is not the same sub-frame with a sub-frame channel for first transmission.

When the number of the frequency-domain channels is 4, the SA channels 1, 2, 3 and 4 of a first frame are marked to be sent for the first time, 1, 2, 3 and 4 are required to be distributed in second, third, fourth, fifth and sixth sub-frames during retransmission, then first transmission sequence numbers of SA channels 5, 6, 7 and 8 are set in idle resources of a second frame, retransmitted 5, 6, 7 and 8 are distributed in the third, fourth, fifth and sixth sub-frames after them. In order to ensure frequency hopping and time diversity gain of retransmission, a time-frequency interval between retransmission and first transmission is as large as possible.

The number of other time-domain SA sub-frames is N, the number of the frequency-domain channels is larger than N/2, and designing follows a design principle of embodiment 1 and embodiment 2.

Example Embodiment 3

In each SA period, the number of frequency-domain channels of SA is configured according to the number of time-domain sub-frames.

The number of the time-domain SA sub-frames is N, the number of the frequency-domain channels is configured to be N/2, a resource group is [N/2, N/2], and retransmission is performed once.

FIG. 22 is a schematic diagram of an RU of 2 sub-frames with time-domain sub-frames more than frequency-domain sub-frames according to example embodiment 3 of the present disclosure. As shown in FIG. 22, the number of the time-domain sub-frames is 8, and then the number of frequency-domain SA channels is 4.

Wherein, N*N channels form a matrix A during first transmission in the first N/2 sub-frames, and during retransmission, a transposed matrix AT of the first N*N channels may be formed. FIG. 23 is a schematic diagram of an RU of which the number of time domains is twice the number of frequency domains according to example embodiment 3 of the present disclosure, as shown in FIG. 23.

Example Embodiment 4

In each SA period, the number of frequency-domain resources of SA is configured according to the number of time-domain sub-frames.

The number of the time-domain SA sub-frames is N, the number of the frequency-domain resources is configured to be N/2, and a resource group is [N/2, N/2].

The number of the time-domain sub-frames is 8, the number of SA channels is 16, and retransmission resources may implement frequency hopping between different blocks, so as to increase a frequency-domain diversity gain on one hand and meet partial mutual monitoring of resource groups on the other hand.

Figures 24, 25:
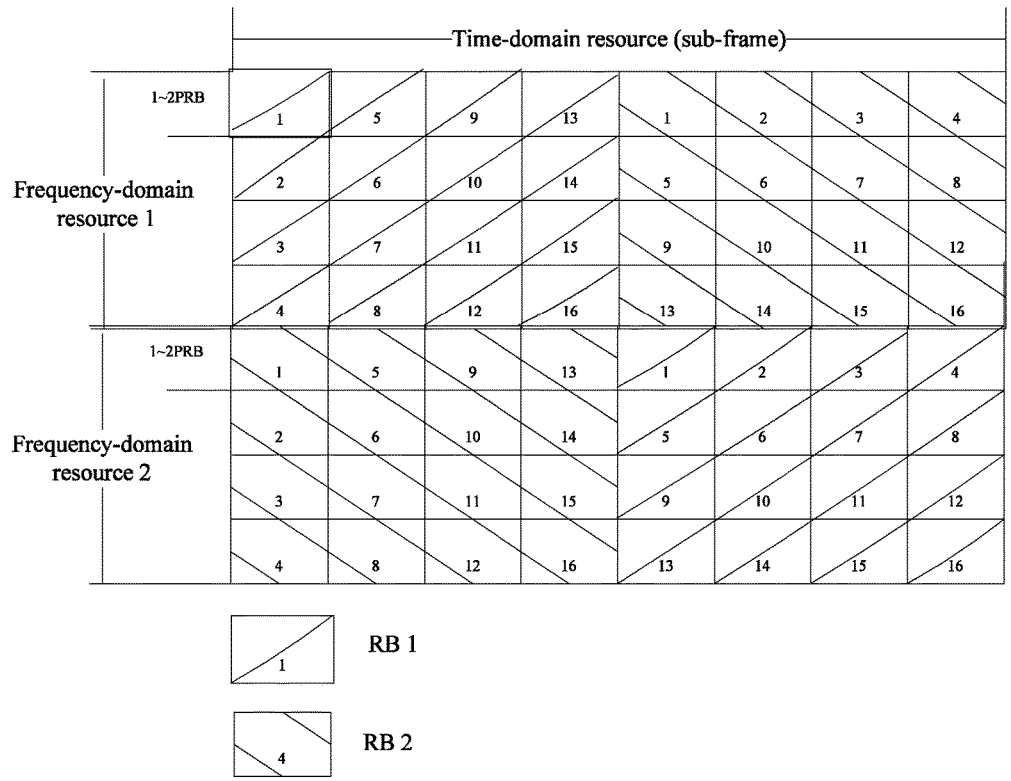
FIG. 24 is a schematic diagram of frequency hopping of a resource group according to example embodiment 4 of the present disclosure.

FIG. 24 is a schematic diagram of frequency hopping of a resource group according to example embodiment 4 of the present disclosure. As shown in FIG. 24, retransmission is performed once, a retransmission component adopts a transposed component of a first transmission resource group, frequency hopping may be implemented between components, and frequency hopping may also not be implemented.

Wherein, two time-domain resource groups may be within one resource scheduling period, and may also be within two resource scheduling periods.

Example Embodiment 5

In each SA period, the number of frequency-domain resources of SA is configured according to the number of time-domain sub-frames.

The number of the time-domain SA sub-frames is N, the number of the frequency-domain resources is configured to be N−1, and a size of a resource group is [N, N−1].

Retransmission is performed for three times.

When the number of the time-domain sub-frames is 5, the number of frequency-domain SA channels is 4.

Because of 4 times transmission, one idle sub-frame in the 5 sub-frames is configured to monitor other sub-frame channels.

FIG. 25 is a schematic diagram of a mode of four transmission according to an example embodiment of the present disclosure, as shown in FIG. 25, wherein FIG. 25(a) is a first schematic diagram of a mode of four transmission according to an example embodiment of the present disclosure, and FIG. 25(b) is a second schematic diagram of a mode of four transmission according to an example embodiment of the present disclosure. A frequency diversity gain in FIG. 25(a) is better than that in FIG. 25(b).

Descriptions will be made below with FIG. 25(a) as an example.

Corresponding to an RU determination manner in FIG. 25(a), the following formula may be adopted for implementation: x(k, m)=1+mod((4*(m−1)+k−1),5), where k represents a row, k<=5, m represents a column, m>=1 and m<=4, and the number of SA RUs in a frequency-domain SA group is required to be a multiple of 4.

Example Embodiment 6

The number of frequency-domain resources of SA is configured according to the number of time-domain sub-frames.

The number of the time-domain SA sub-frames is N, the number of the frequency-domain resources is configured to be (N−1)/2, retransmission is performed for three times, and a resource group is [N, (N−1)/2].

The resource group includes 4*5 SA channels, retransmission is performed once on first five sub-frames, and frequency hopping may be implemented between blocks in the resource group formed by the latter five sub-frames, as shown in FIG. 22; and retransmission is performed for three times, retransmission is performed once on a first resource group on a time domain, and after a second resource group is rearranged on the time domain, frequency hopping may be implemented between resource groups, as shown in FIG. 24. FIG. 24 is a schematic diagram of frequency hopping of a resource group according to example embodiment 4 of the present disclosure. Frequency hopping may also not be implemented. Frequency hopping is intended to increase a frequency-domain diversity gain.

Wherein, the first five frames may be located in the first SA period, the latter five frames may be located in the second SA period, and the 10 frames may all be located in one SA period.

Example Embodiment 7

Under coverage, a channel of a D2D transmitter is scheduled by an eNodeB, so that information indicating an SA channel should include a frequency-domain resource index M and a channel index. For example, for a 20M bandwidth, each SA includes one PRB, there may be included 100 PRBs in the 20M bandwidth. Each scheduling period includes 5 SA sub-frames, a frequency domain may be divided into 25 groups, with the index being 25. The resource index may index a frequency-domain group with 5 bit, retransmission is performed once, and each resource group includes 10 SA logical channels, indicated by 4 bit.

| Item | Num of bits |
| --- | --- |
| SA location | Frequency block indication, for example, each resource group includes 4 PRB pairs<br>5 bit is configured to indicate a resource group (20 MHz)<br>4 bit indicates a logical channel index of SA |

Example Embodiment 8

For an resource pool pre-configuration manner in an uncovered Scenario, Tx UE selects a resource group.

Wherein, before the resource group is selected, monitoring is performed at first, the resource group of which information is required to be continuously monitored is determined. A sequence number of the resource group required to be continuously monitored is selected, idle SA channel resources of the resource group are monitored at the same time. Idle SA channels of the resource group are obtained by power detection and SA manner decoding, and the number of the idle channels is compared. The idle channels refers to unoccupied channels, and when the number of the idle channels is larger than a set threshold value, indexes of the idle SA resources are selected by competition.

Figures 25, 26:
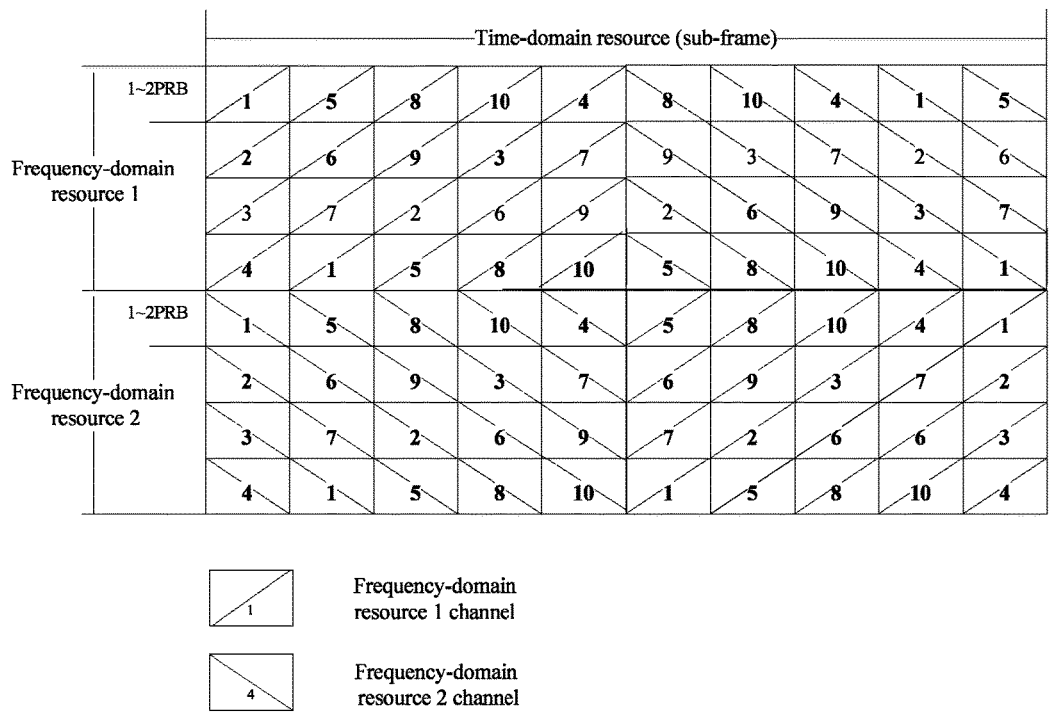
FIG. 26 is a schematic diagram of once frequency hopping in four transmission according to an example embodiment of the present disclosure.

When the number of the idle channels is smaller than the set threshold, the resource group is strained. Whether there is an idle resource group not occupied by other users or not is checked, and the idle resource group is selected, that is, the same user group selects different resource groups. Mutual communication between the groups may be implemented by frequency hopping between the resource groups. FIG. 26 is a schematic diagram of once frequency hopping in four transmission according to an example embodiment of the present disclosure. As shown in FIG. 26, time-domain resource groups may be within different scheduling periods, that is, an SA scheduling period includes 5 SA sub-frames, the other 54 sub-frames are within the second scheduling period, and they may also be within one SA scheduling period, that is, the SA scheduling period includes 10 SA sub-frames.

Besides SA requires mutual monitoring to be ensured, mutual monitoring is also required to be ensured between data, so that such a designing concept may also be introduced into a data designing pattern.

Obviously, those skilled in the art should know that each module or each step of the present disclosure may be implemented by a universal computing device. The modules or steps may be concentrated on a single computing device or distributed on a network formed by a plurality of computing devices, and may optionally be implemented by program codes executable for the computing devices, so that the modules or steps may be stored in a storage device for execution with the computing devices, the shown or described steps may be executed in sequences different from those described here in some circumstances, or may form each integrated circuit module respectively, or multiple modules or steps therein may form a single integrated circuit module for implementation. As a consequence, the present disclosure is not limited to any specific hardware and software combination.

The above is only the example embodiment of the present disclosure and not intended to limit the present disclosure, and for those skilled in the art, the present disclosure may have various modifications and variations. Any modifications, equivalent replacements, improvements and the like within the spirit and principle of the present disclosure shall fall within the scope of protection of the present disclosure.

INDUSTRIAL APPLICABILITY

As mentioned above, the embodiment of the present disclosure provides the method and device for processing D2D communication, the D2D communication device and the eNodeB. The problem of incapability of UE in a D2D half-duplex system in monitoring each other in the related technology is solved, and the effect of implementing effective mutual monitoring of the UE in the D2D half-duplex system is further achieved.

The invention claimed is:

1. A method for processing Device-to-Device (D2D) communication, comprising:
   determining a resource configuration configured for Scheduling Assignment (SA) and/or data of D2D communication, wherein resources configured for the SA and/or data of D2D communication are divided into M resource groups, each resource group comprises X Resource Units (RUs) formed by N time-domain RUs*K frequency-domain RUs, each RU comprises O symbols on a time domain, and comprises P subcarriers on a frequency domain, the X RUs in each resource group are configured to configure T logical channels, each logical channel comprises Num RUs according to the number Num of sending times, locations of each logical channel in the resource groups are determined according to a preset rule, and the preset rule is configured to limit that each logical channel in a resource group comprises at least one RU which is located on different time domains at least once with the RUs of the other logical channels in the resource group, wherein M, N, K, X, O, P, T and Num are all integers, wherein the preset rule is that the number N of the time-domain RUs in each resource group is larger than the number K of the frequency-domain RUs or the number N of the time-domain RUs in each resource group is equal to the number K of the frequency-domain RUs; and
   performing D2D communication processing according to the determined resource configuration, comprising performing resource selection according to a resource group indication about a resource group and a logical channel indication about a logical channel corresponding to the resource group in the determined resource configuration.

2. The method as claimed in claim 1, wherein determining the resource configuration configured for the SA and/or data of D2D communication comprises at least one of:
   receiving the resource configuration configured for the SA and/or data of D2D communication from an Evolved Node B (eNodeB); and
   monitoring resources configured for D2D communication, and determining the resource configuration configured for the SA and/or data of D2D communication according to a monitoring result.

3. The method as claimed in claim 1, wherein determining the resource configuration configured for the SA and/or data of D2D communication further comprises:
   configuring that physical resources of the logical channels located in a same sub-frame during first transmission are located in different sub-frames at least once during retransmission.

4. The method as claimed in claim 3, wherein configuring that the physical resources of the logical channels located in the same sub-frame during first transmission are located in different sub-frames at least once during retransmission when the number N of the time-domain RUs in each resource group is equal to the number K of the frequency-domain RUs comprises:
   constructing a matrix and corresponding logical channel sequence numbers for the RUs in the resource groups according to the numbers of the time/frequency-domain RUs, and configuring that a sequence number is selected for sending according to a physical resource corresponding to the matrix sequence number during first transmission and for sending according to a physical resource corresponding to the sequence in a transposed matrix of the matrix during retransmission.

5. The method as claimed in claim 1, wherein
   the frequency-domain RUs in the resource groups are continuously allocated, or are allocated at equal intervals; and
   the time-domain RUs in the resource groups are continuously allocated, or are allocated at equal intervals.

6. The method as claimed in claim 1,
   wherein the preset rule limits in a following manner that each logical channel in a resource group comprises at least one RU which is located on different time domains at least once with the RUs of the other logical channels in the resource group:
   Step 1: putting numbers 1, 2, 3, . . . k*(m+1)/2 into cells numbered as (k, m) according to a following formula:

$$x(k, m) = m + \sum_{i=1}^{k} (\max(subn) - i + 1) \cdot \min(1, (i-1)),$$

where a row number is k, k>=1 and k<=max(subn)−1, a column number is m, m>=1 and m<=max(subn)−1, it is restricted that k+m<=max(subn), i is a natural number, max(subn) is a maximum time-domain SA physical unit number within an SA resource period, and min(1, (i−1)) adopts a relatively smaller value in 1, (i−1);
   Step 2: reading max(subn) numbers in the cells (k, m) in a following manner: for a first time, starting reading a first column from the cell of k=1 and m=1, then reading k=1 and a (max(subn)−1)th column, and sequentially filling the read numbers into a first row of [1, m+1], that is, k=1; for the second time, automatically increasing m by 1, starting reading a second column from the cell of k=1 and m=2, then reading k=1 and a (max(subn)−m)th column, and sequentially filling the read numbers into a second row of [2, m+1], that is, k=2, . . . ; continuing reading k=1 and an (m=RoundU(max(subn)−1)/2)th column according to a same method, reading k=1 and numbers corresponding to an (m=RoundD(max(subn)−1)/2+1)th column, where RoundD is rounding down and RoundU is rounding up, and sequentially filling the read numbers into a (RoundU(max(subn)−1/2)th row of [RoundU(max(subn)−1/2, m+1]; then according to a reverse sequence, for the first time, starting reading the first column from a cell of k=1 and m=RoundD(max(subn)−1)/2+1, then reading k=1 and an (m=RoundU(max(subn)−1)/2)th column, and sequentially filling the read numbers into a row of [RoundU(max(subn)−1/2+1, m+1], . . . ; then reading the second column according to a reading sequence of k=1 and m=max(subn)−2, then reading k=1 and the cell column of m=2, and sequentially filling the read numbers into the second last row of [k, m+1]; and sequentially reading k=1 and an (m=max(subn)−1)th column, then reading k=1 and the cell column of m=1, and sequentially filling the read numbers into the last row of [k, m+1].

7. The method as claimed in claim 6, wherein that the preset rule limits in the abovementioned manner that each logical channel in a resource group comprises at least one RU which is located on different time domains at least once with the RUs of the other logical channels except the logical channel is repeated by adopting a following formula:
   x(k, m)=1+mod((4*(m−1)+k−1),5), where mod is a modulus operation.

8. The method as claimed in claim 1, wherein performing D2D communication processing according to the determined resource configuration further comprises:
    performing D2D communication processing according to a selected resource.

9. A method for processing Device-to-Device (D2D) communication, comprising:
    determining a resource configuration configured for Scheduling Assignment (SA) and/or data of D2D communication, wherein resources configured for the SA and/or data of D2D communication are divided into M resource groups, each resource group comprises X Resource Units (RUs) formed by N time-domain RUs*K frequency-domain RUs, each RU comprises O symbols on a time domain, and comprises P subcarriers on a frequency domain, the X RUs in each resource group are configured to configure T logical channels, each logical channel comprises Num RUs according to the number Num of sending times, locations of each logical channel in the resource groups are determined according to a preset rule, and the preset rule is configured to limit that each logical channel in a resource group comprises at least one RU which is located on different time domains at least once with the RUs of the other logical channels in the resource group, wherein M, N, K, X, O, P, T and Num are all integers, wherein the preset rule is that the number N of the time-domain RUs in each resource group is larger than the number K of the frequency-domain RUs or the number N of the time-domain RUs in each resource group is equal to the number K of the frequency-domain RUs; and
    sending the determined resource configuration to a D2D communication device, comprising indicating a resource group and a logical channel corresponding to the resource group in the determined resource configuration.

10. The method as claimed in claim 9, wherein determining the resource configuration configured for the SA and/or data of D2D communication further comprises:
    configuring that physical resources of the logical channels located in a same sub-frame during first transmission are located in different sub-frames at least once during retransmission.

11. The method as claimed in claim 10, wherein configuring that the physical resources of the logical channels located in the same sub-frame during first transmission are located in different sub-frames at least once during retransmission when the number N of the time-domain RUs in each resource group is equal to the number K of the frequency-domain RUs comprises:
    constructing a matrix and corresponding logical channel sequence numbers for the RUs in the resource groups according to the numbers of the time/frequency-domain RUs, and configuring that a sequence number is selected for sending according to a physical resource corresponding to the matrix sequence number during first transmission and for sending according to a physical resource corresponding to the sequence in a transposed matrix of the matrix during retransmission.

12. The method as claimed in claim 9, wherein the preset rule limits in a following manner that each logical channel in a resource group comprises at least one RU which is located on different time domains at least once with the RUs of the other logical channels in the resource group:
    Step 1: putting numbers 1, 2, 3, ... k*(m+1)/2 into cells numbered as (k, m) according to a following formula:

$$x(k, m) = m + \sum_{i=1}^{k} (\max(subn) - i + 1) \cdot \min(1, (i-1)),$$

where a row number is k, k>=1 and k<=max(subn)-1, a column number is m, m>=1 and m<=max(subn)-1, it is restricted that k+m<=max(subn), i is a natural number, max(subn) is a maximum time-domain SA physical unit number within an SA resource period, and min(1, (i-1)) adopts a relatively smaller value in 1, (i-1);
    Step 2: reading max(subn) numbers in the cells (k, m) in a following manner: for a first time, starting reading a first column from the cell of k=1 and m=1, then reading k=1 and a (max(subn)-1)th column, and sequentially filling the read numbers into a first row of [1, m+1], that is, k=1; for the second time, automatically increasing m by 1, starting reading a second column from the cell of k=1 and m=2, then reading k=1 and a (max(subn)-m)th column, and sequentially filling the read numbers into a second row of [2, m+1], that is, k=2, ...; continuing reading k=1 and an (m=RoundU(max(subn)-1)/2)th column according to a same method, reading k=1 and numbers corresponding to an (m=RoundD(max(subn)-1)/2+1)th column, where RoundD is rounding down and RoundU is rounding up, and sequentially filling the read numbers into a (RoundU(max(subn)-1/2)th row of [RoundU(max(subn)-1/2, m+1]; then according to a reverse sequence, for the first time, starting reading the first column from a cell of k=1 and m=RoundD(max(subn)-1)/2+1, then reading k=1 and an (m=RoundU(max(subn)-1)/2)th column, and sequentially filling the read numbers into a row of [RoundU(max(subn)-1/2+1, m+1], ...; then reading the second column according to a reading sequence of k=1 and m=max(subn)-2, then reading k=1 and the cell column of m=2, and sequentially filling the read numbers into the second last row of [k, m+1]; and sequentially reading k=1 and an (m=max(subn)-1)th column, then reading k=1 and the cell column of m=1, and sequentially filling the read numbers into the last row of [k, m+1].

13. The method as claimed in claim 12,
    wherein that the preset rule limits in the abovementioned manner that each logical channel in a resource group comprises at least one RU, which is located on different time domains at least once with the RUs of the other logical channels in the resource group is repeated by adopting a following formula:
    x(k, m)=1+mod((4*(m-1)+k-1),5), where mod is a modulus operation.

14. The method as claimed in claim 9, wherein sending the determined resource configuration to the D2D communication device further comprises:
    sending to the D2D communication device the resource configuration including a resource group indication which indicates the resource group and a logical channel indication which indicates the logical channel corresponding to the resource group in the resource configuration.

15. A device for processing Device-to-Device (D2D) communication, comprising a processor, configured to perform programming components stored in a memory, wherein the programming components comprise:
    a first determining component, configured to determine a resource configuration configured for Scheduling Assignment (SA) and/or data of D2D communication, wherein resources configured for the SA and/or data of D2D communication are divided into M resource groups, each resource group comprises X Resource Units (RUs) formed by N time-domain RUs*K frequency-domain RUs, each RU comprises O symbols on a time domain, and comprises P subcarriers on a frequency domain, the X RUs in each resource group are configured to configure T logical channels, each logical channel comprises Num RUs according to the number Num of sending times, locations of each logical channel in the resource groups are determined according to a preset rule, and the preset rule is configured to limit that each logical channel in a resource group comprises at least one RU which is located on different time domains at least once with the RUs of the other logical channels in the resource group, wherein M, N, K, X, O, P, T and Num are all integers, wherein the preset rule is that the number N of the time-domain RUs in each resource group is larger than the number K of the frequency-domain RUs or the number N of the time-domain RUs in each resource group is equal to the number K of the frequency-domain RUs; and a processing component, configured to perform D2D communication processing according to the determined resource configuration, said processing component comprising a selecting element configured to perform resource selection according to a resource group indication about a resource group and a logical channel indication about a logical channel corresponding to the resource group in the determined resource configuration.

16. The device as claimed in claim 15, wherein the first determining component comprises at least one of:

a receiving element, configured to receive the resource configuration configured for the SA and/or data of D2D communication from an Evolved Node B (eNodeB); and a determining element, configured to monitor resources configured for D2D communication, and determine the resource configuration configured for the SA and/or data of D2D communication according to a monitoring result.

17. The device as claimed in claim 15, wherein the first determining component comprises:

a first configurating element, configured to configure that physical resources of the logical channels located in a same sub-frame during first transmission are located in different sub-frames at least once during retransmission.

18. The device as claimed in claim 15, wherein the first configurating element comprises:

a first configurating sub-element, configured to construct a matrix and corresponding logical channel sequence numbers for the RUs in the resource groups according to the numbers of the time/frequency-domain RUs, and configure that a sequence number is selected for sending according to a physical resource corresponding to the matrix sequence number during first transmission and for sending according to a physical resource corresponding to the sequence in a transposed matrix of the matrix during retransmission.

19. The device as claimed in claim 15, wherein the processing component further comprises:

a processing element, configured to perform D2D communication processing according to a selected resource.

20. A Device-to-Device (D2D) communication device, comprising the device as claimed in claim 15.

21. A device for processing Device-to-Device (D2D) communication, comprising a processor, configured to perform programming components stored in a memory, wherein the programming components comprise:

a second determining component, configured to determine a resource configuration configured for Scheduling Assignment (SA) and/or data of D2D communication, wherein resources configured for the SA and/or data of D2D communication are divided into M resource groups, each resource group comprises X Resource Units (RUs) formed by N time-domain RUs*K frequency-domain RUs, each RU comprises O symbols on a time domain, and comprises P subcarriers on a frequency domain, the X RUs in each resource group are configured to configure T logical channels, each logical channel comprises Num RUs according to the number Num of sending times, locations of each logical channel in the resource groups are determined according to a preset rule, and the preset rule is configured to limit that each logical channel in a resource group comprises at least one RU which is located on different time domains at least once with the RUs of the other logical channels in the resource group, wherein M, N, K, X, O, P, T and Num are all integers, wherein the preset rule is that the number N of the time-domain RUs in each resource group is larger than the number K of the frequency-domain RUs or the number N of the time-domain RUs in each resource group is equal to the number K of the frequency-domain RUs; and a sending component, configured to send the determined resource configuration to a D2D communication device, said sending component comprising an indicating element, configured to indicate a resource group and a logical channel corresponding to the resource group in the determined resource configuration.

22. The device as claimed in claim 21, wherein the second determining component comprises:

a second configurating element, configured to configure that physical resources of the logical channels located in a same sub-frame during first transmission are located in different sub-frames at least once during retransmission.

23. The device as claimed in claim 22, wherein the second configurating element comprises:

a second configurating sub-element, configured to construct a matrix and corresponding logical channel sequence numbers for the RUs in the resource groups according to the numbers of the time/frequency-domain RUs, and configure that a sequence number is selected for sending according to a physical resource corresponding to the matrix sequence number during first transmission and for sending according to a physical resource corresponding to the sequence in a transposed matrix of the matrix during retransmission.

24. The device as claimed in claim 21, wherein the sending component further comprises:

a sending element, configured to send to the D2D communication device the resource configuration including a resource group indication which indicates the resource group and a logical channel indication which indicates the logical channel corresponding to the resource group in the resource configuration.

25. An Evolved Node B (eNodeB), comprising the device as claimed in claim 21.

* * * * *